(12) United States Patent
Norimatsu et al.

(10) Patent No.: US 7,950,858 B2
(45) Date of Patent: May 31, 2011

(54) BEARING APPARATUS FOR A WHEEL OF VEHICLE

(75) Inventors: Takayuki Norimatsu, Iwata (JP); Akira Fujimura, Iwata (JP); Isao Hirai, Iwata (JP); Shinji Morita, Iwata (JP)

(73) Assignee: NTN Corporation (JP)

( * ) Notice: Subject to any disclaimer, the term of this patent is extended or adjusted under 35 U.S.C. 154(b) by 134 days.

(21) Appl. No.: 12/204,839

(22) Filed: Sep. 5, 2008

(65) Prior Publication Data

US 2009/0003746 A1    Jan. 1, 2009

Related U.S. Application Data

(63) Continuation of application No. PCT/JP2007/000108, filed on Feb. 21, 2007.

(30) Foreign Application Priority Data

| Mar. 8, 2006 | (JP) | ................................ 2006-062868 |
| Apr. 21, 2006 | (JP) | ................................ 2006-118270 |
| May 15, 2006 | (JP) | ................................ 2006-135403 |
| May 15, 2006 | (JP) | ................................ 2006-135404 |
| Jun. 28, 2006 | (JP) | ................................ 2006-178376 |

(51) Int. Cl.
*F16C 19/49* (2006.01)
*F16C 33/60* (2006.01)
*B60B 35/18* (2006.01)

(52) U.S. Cl. ........................................ 384/544; 384/494

(58) Field of Classification Search .................. 384/494, 384/544
See application file for complete search history.

(56) References Cited

U.S. PATENT DOCUMENTS 6,036,371 A * 3/2000 Onose ............................ 384/494
7,104,695 B2 * 9/2006 Shevket ........................ 384/450

FOREIGN PATENT DOCUMENTS

| JP | 11-091308 | 4/1999 |
| JP | 2002-021858 | 1/2002 |
| JP | 2002-195254 | 7/2002 |
| JP | 2004-100887 | 4/2004 |
| JP | 2004-108449 | 4/2004 |
| JP | 2005-188738 | 7/2005 |

* cited by examiner

*Primary Examiner* — William C Joyce
(74) *Attorney, Agent, or Firm* — Harness, Dickey & Pierce, P.L.C.

(57) ABSTRACT

A vehicle wheel bearing apparatus has an outer member formed with a body mounting flange on its outer circumferential surface. The body mounting flange is to be mounted on a knuckle of the vehicle. The outer member inner circumference includes double row outer raceway surfaces. An inner member includes a wheel hub with a wheel mounting flange formed on one end. A cylindrical portion extends from the wheel mounting flange. At least one inner ring is press-fit onto the cylindrical portion of the wheel hub. The inner ring outer circumference is formed with an inner raceway surface arranged opposite to the double row outer raceway surfaces. Double row rolling elements are freely rollably contained between the outer raceway surfaces and inner raceway surfaces of the outer member and the inner members. Seals are mounted within annular openings formed between the outer member and the inner member. The inner ring is axially secured relative to the wheel hub by a caulked portion. The caulked portion is formed by radially outwardly plastically deforming the end of the cylindrical portion of the wheel hub. Outer side rolling elements of the double row rolling elements are balls. The inner side rolling elements of the double row rolling elements are tapered rollers. The fundamental rated load of the inner side row of tapered rollers is set larger than that of the outer side row of balls.

7 Claims, 16 Drawing Sheets

[Fig 1]
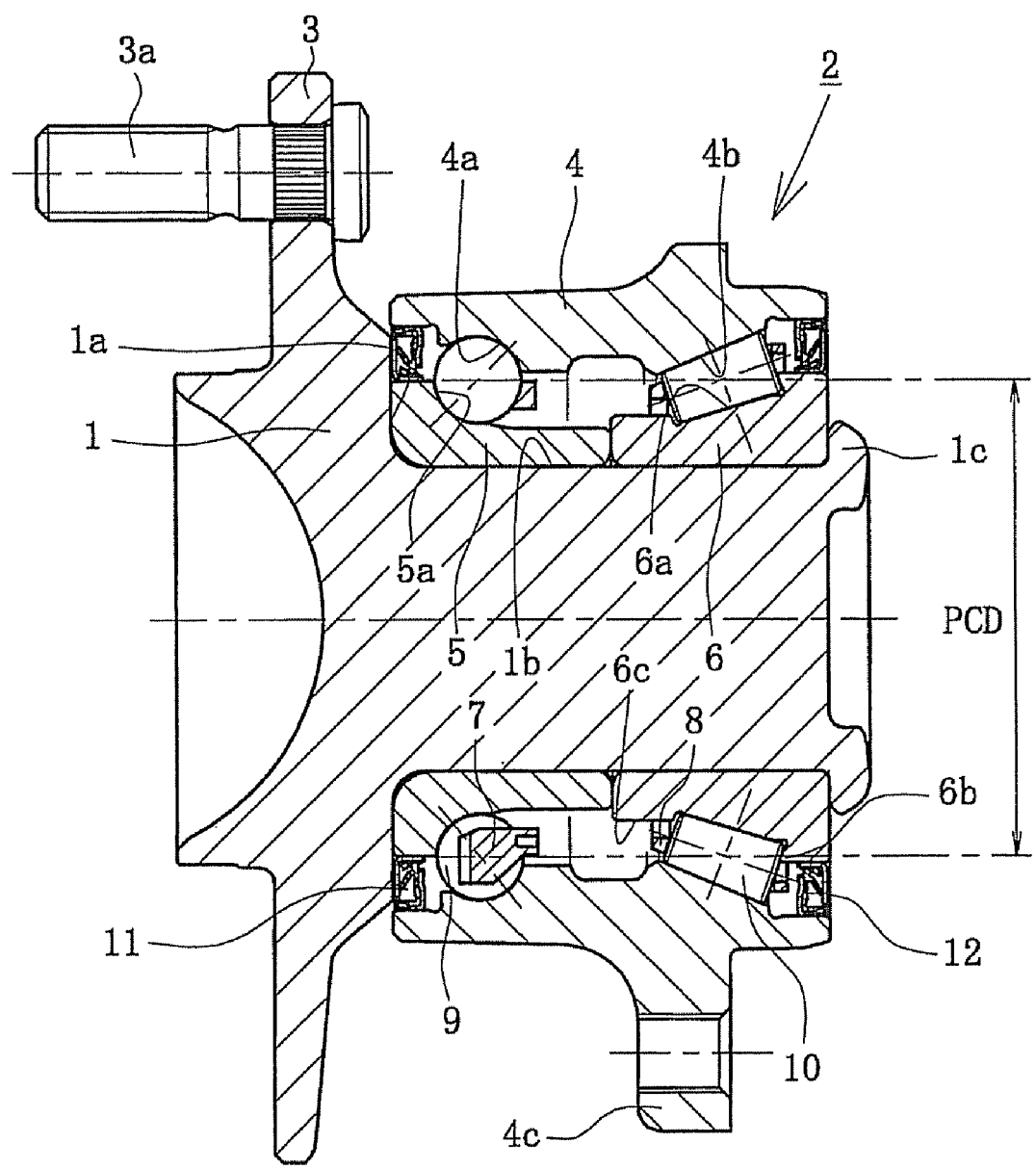

[Fig 2]
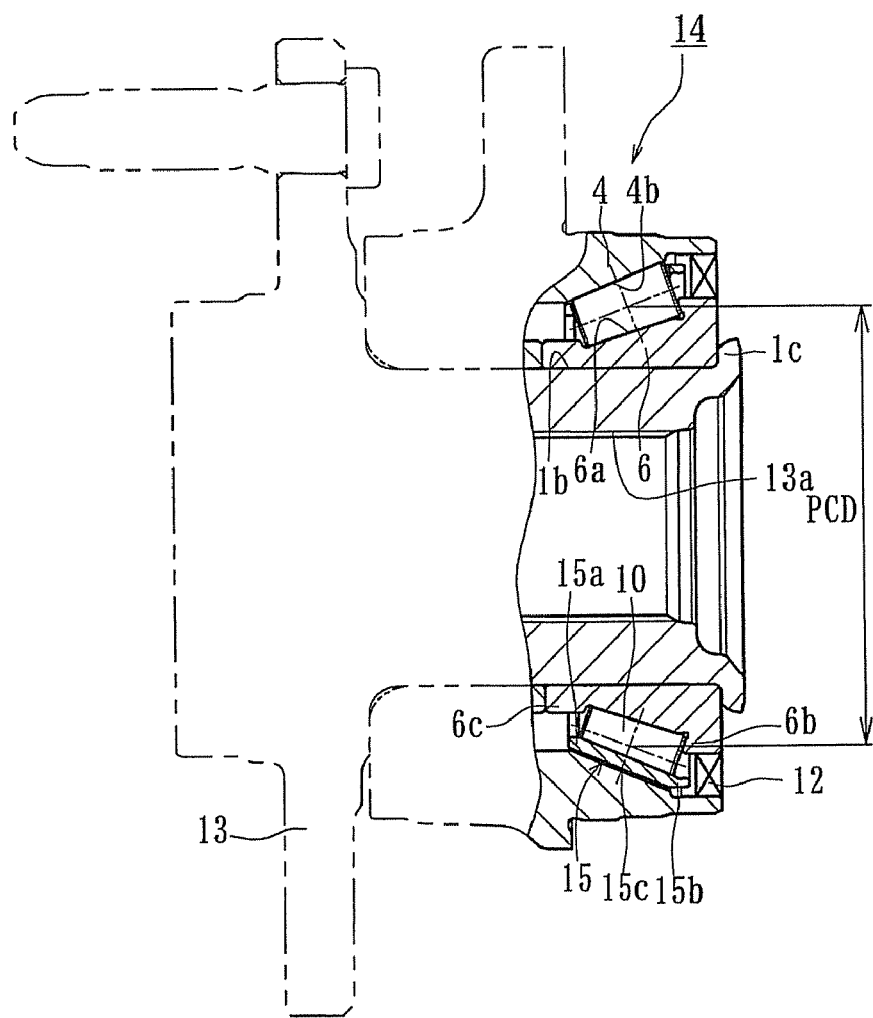
[Fig 3]
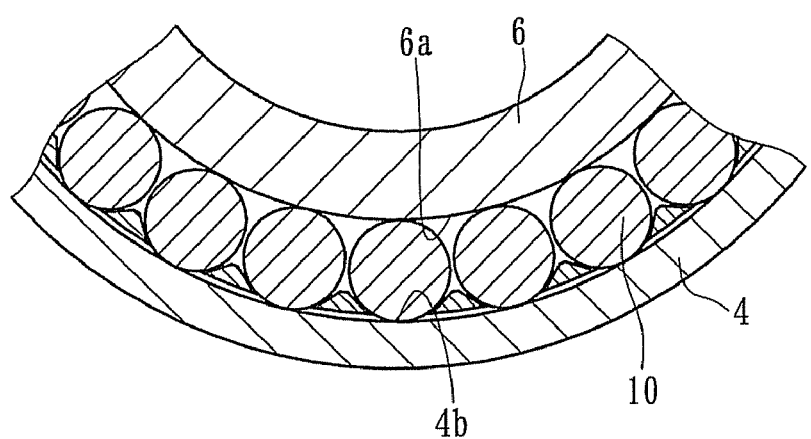

[Fig 4]
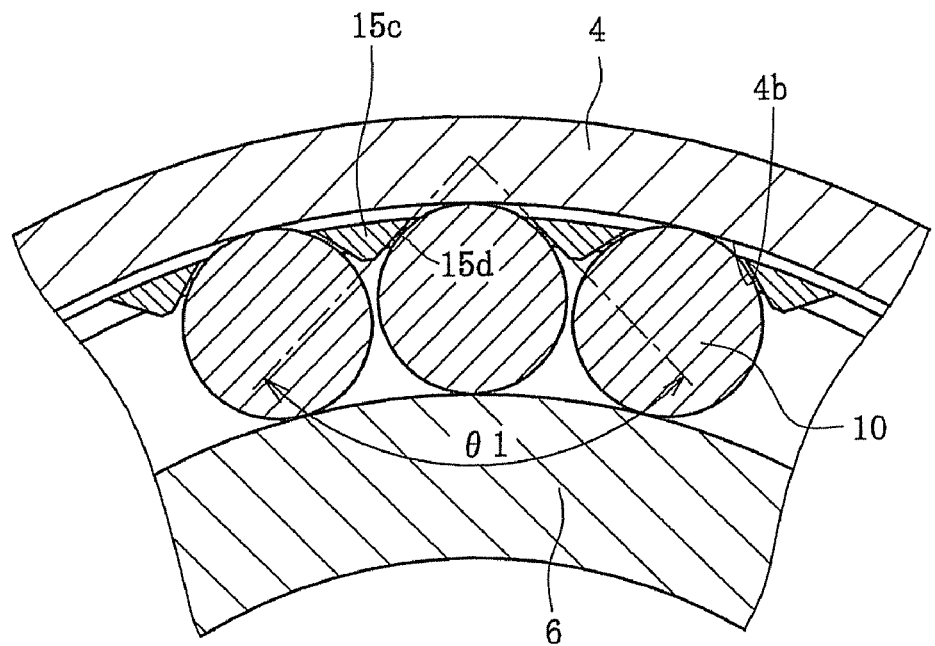
[Fig 5]
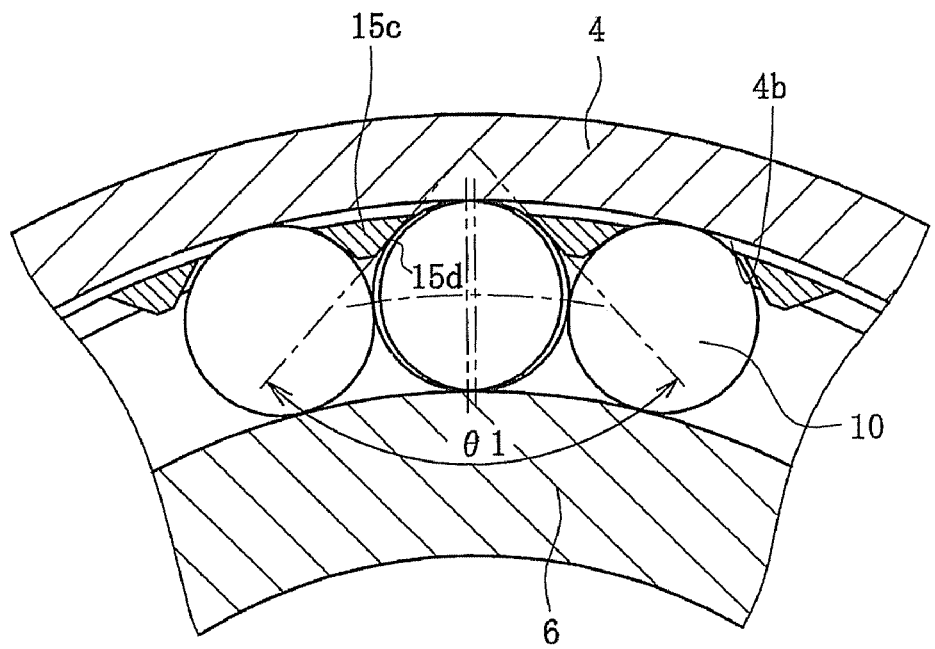

[Fig 6]
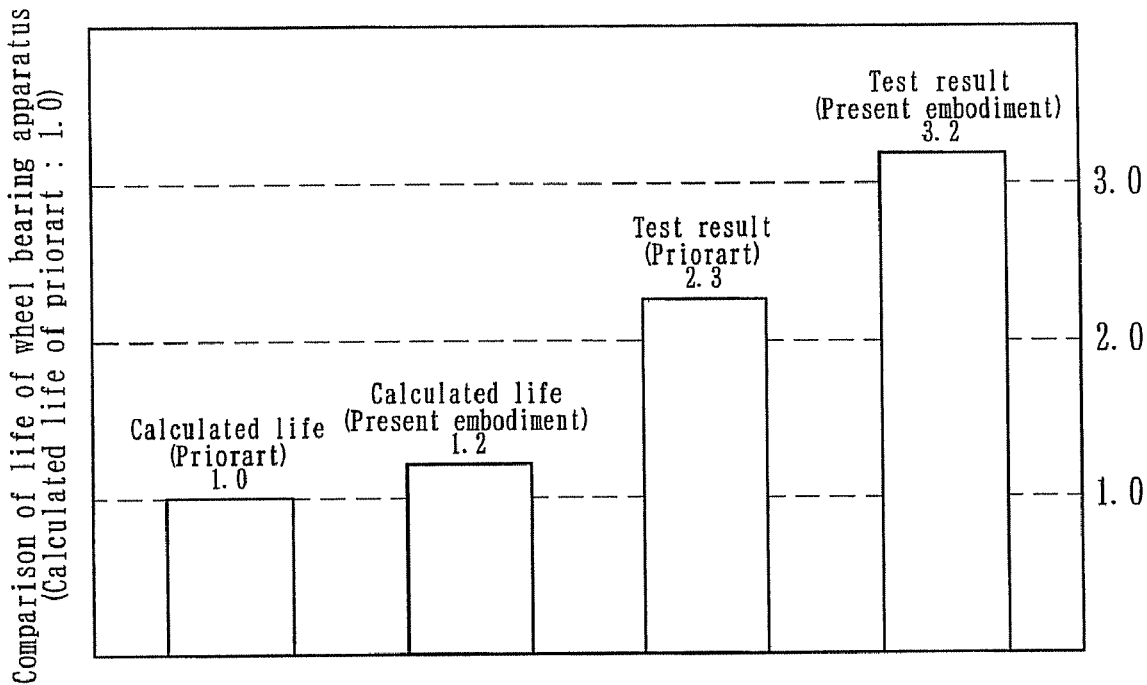
[Fig 7]
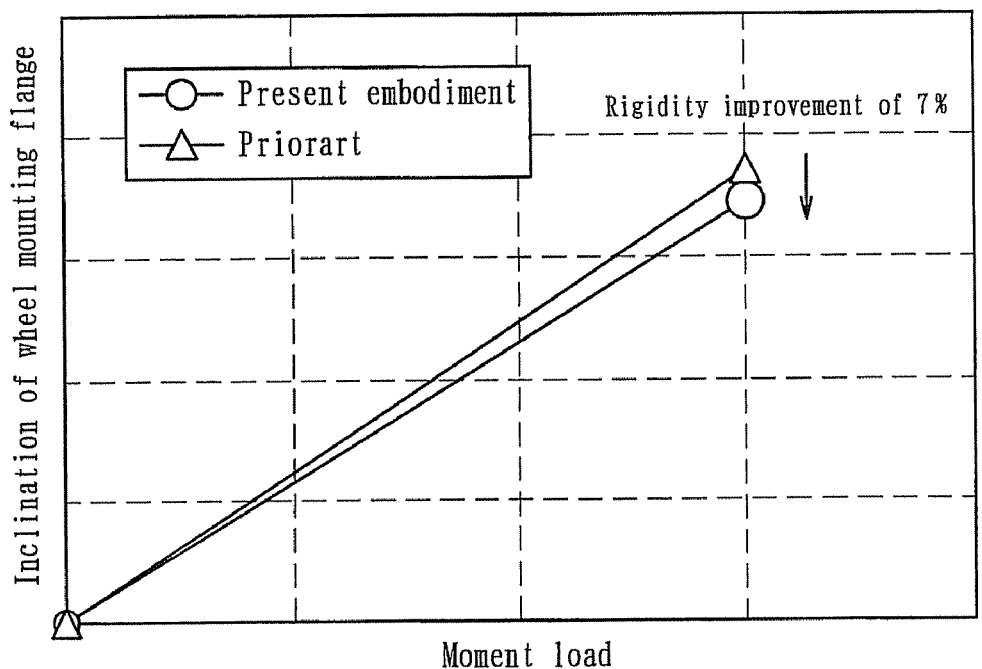

[Fig 8]
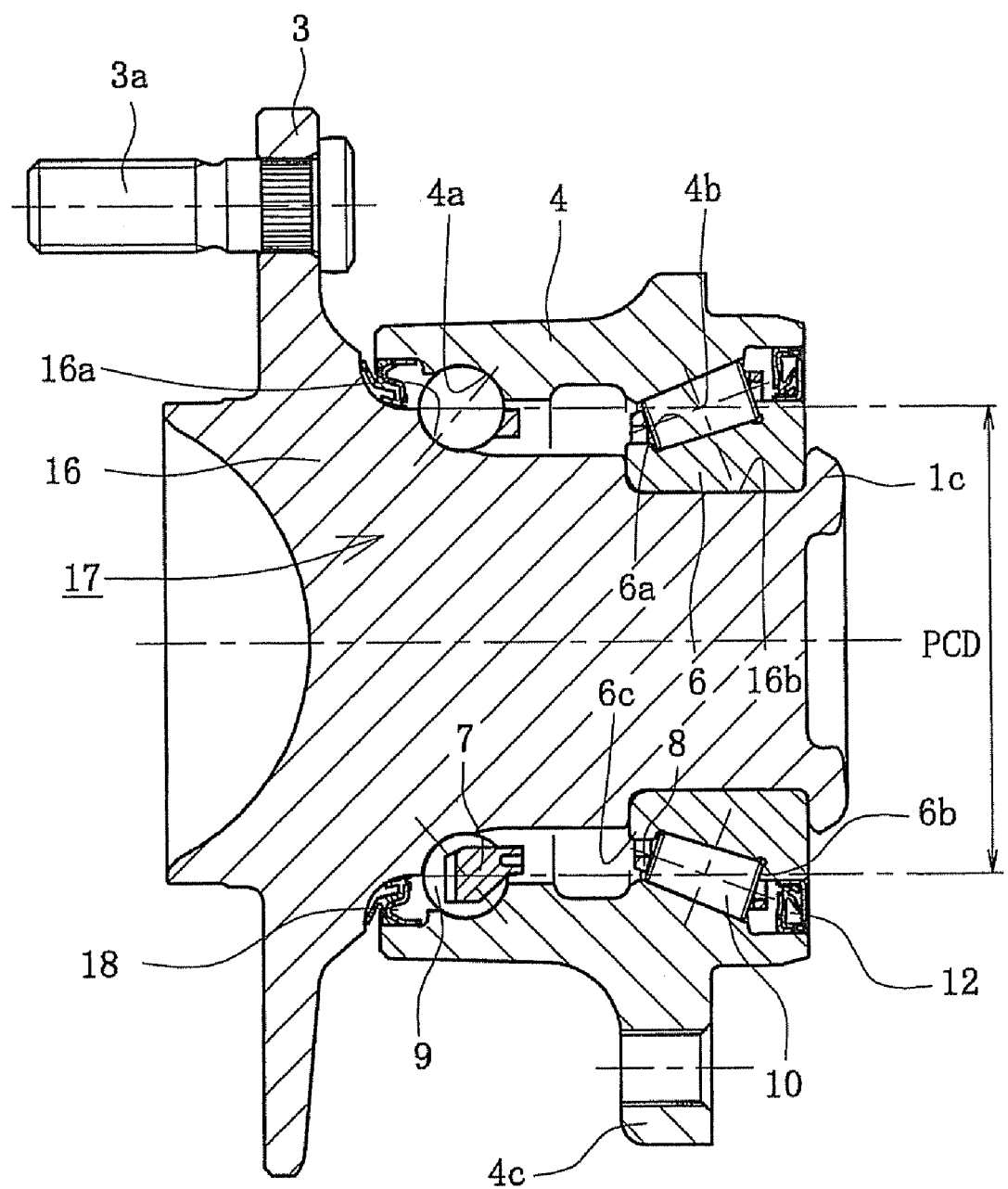

[Fig 9]
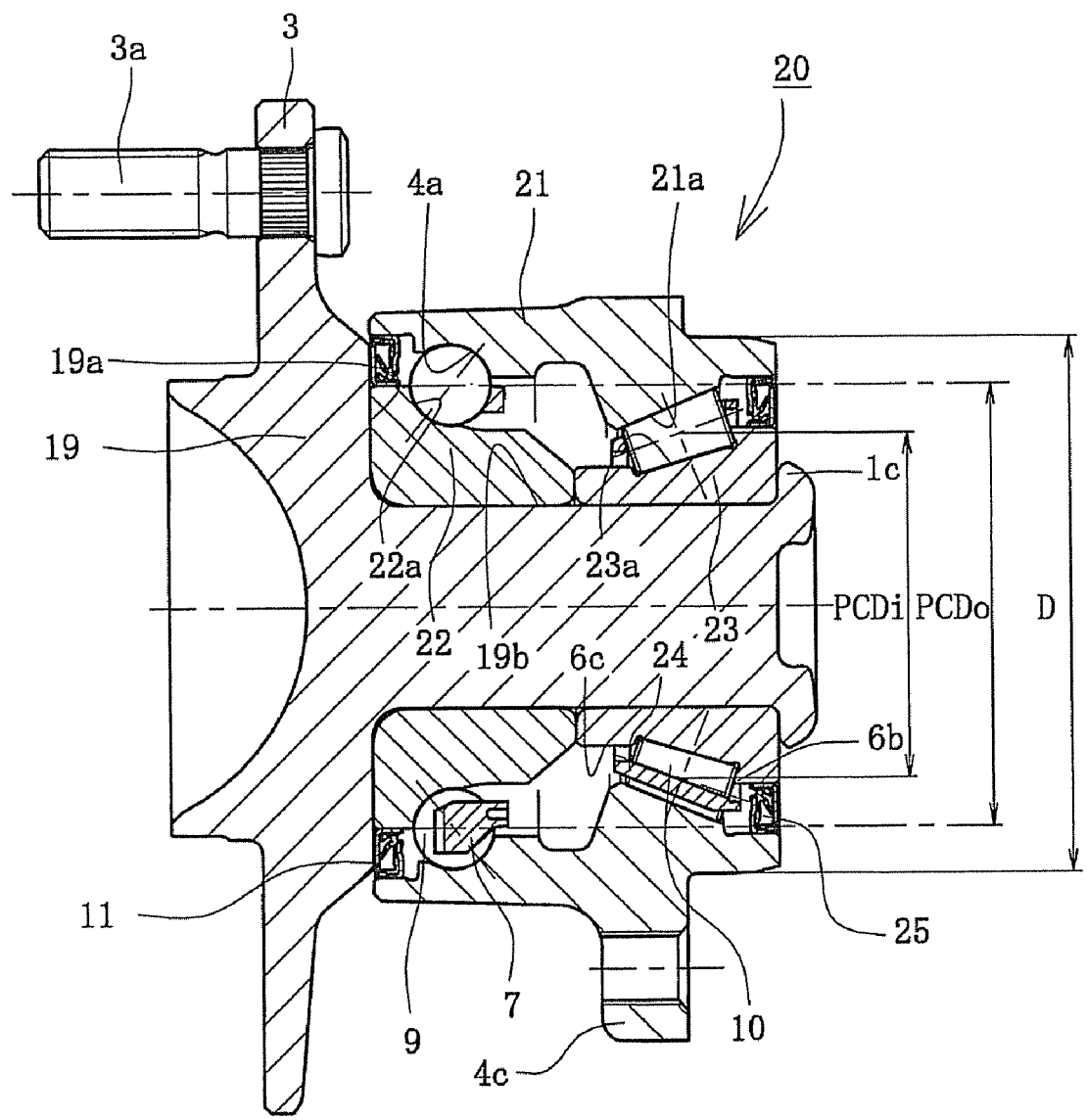

[Fig 10]
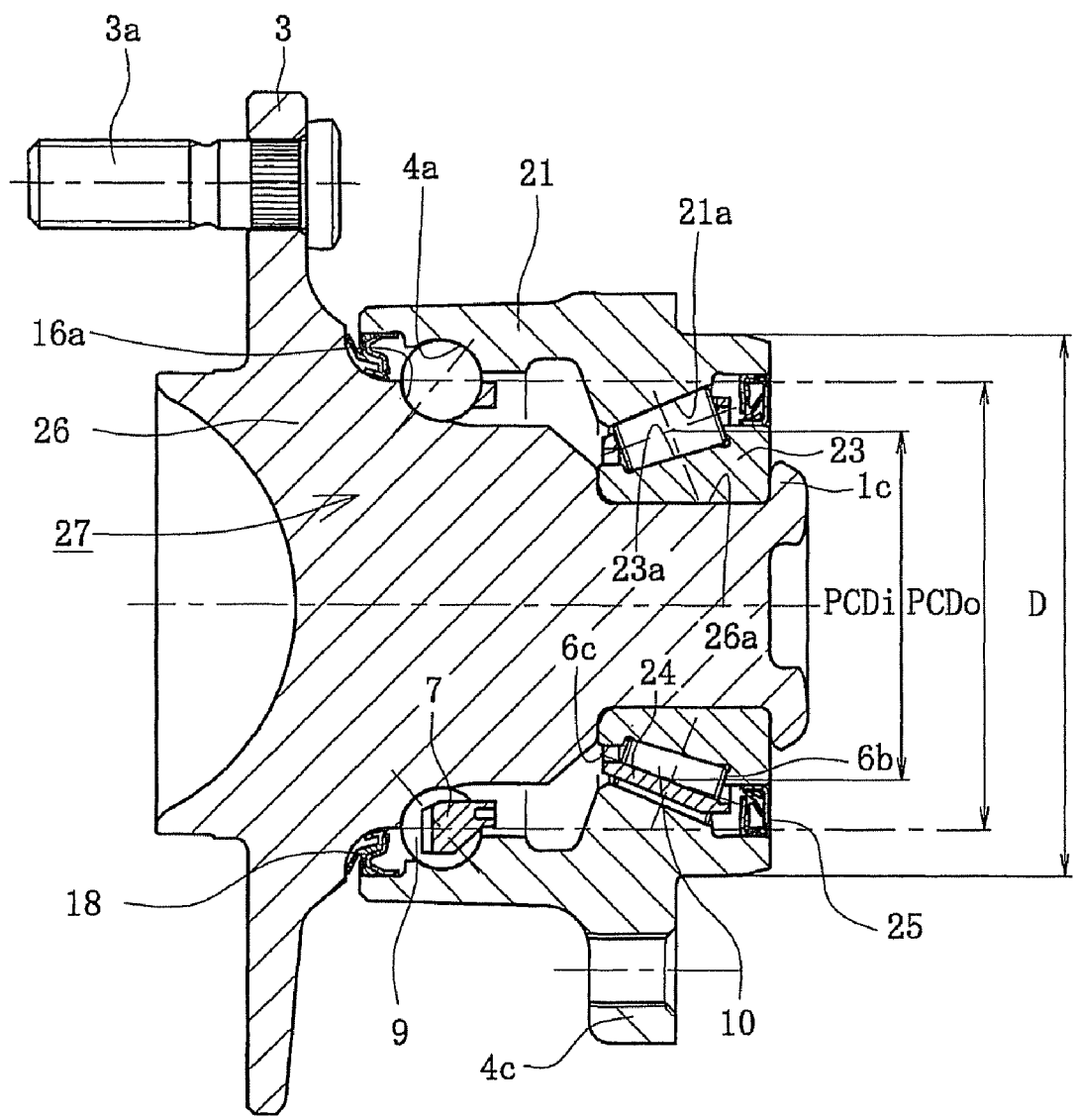

[Fig 11]
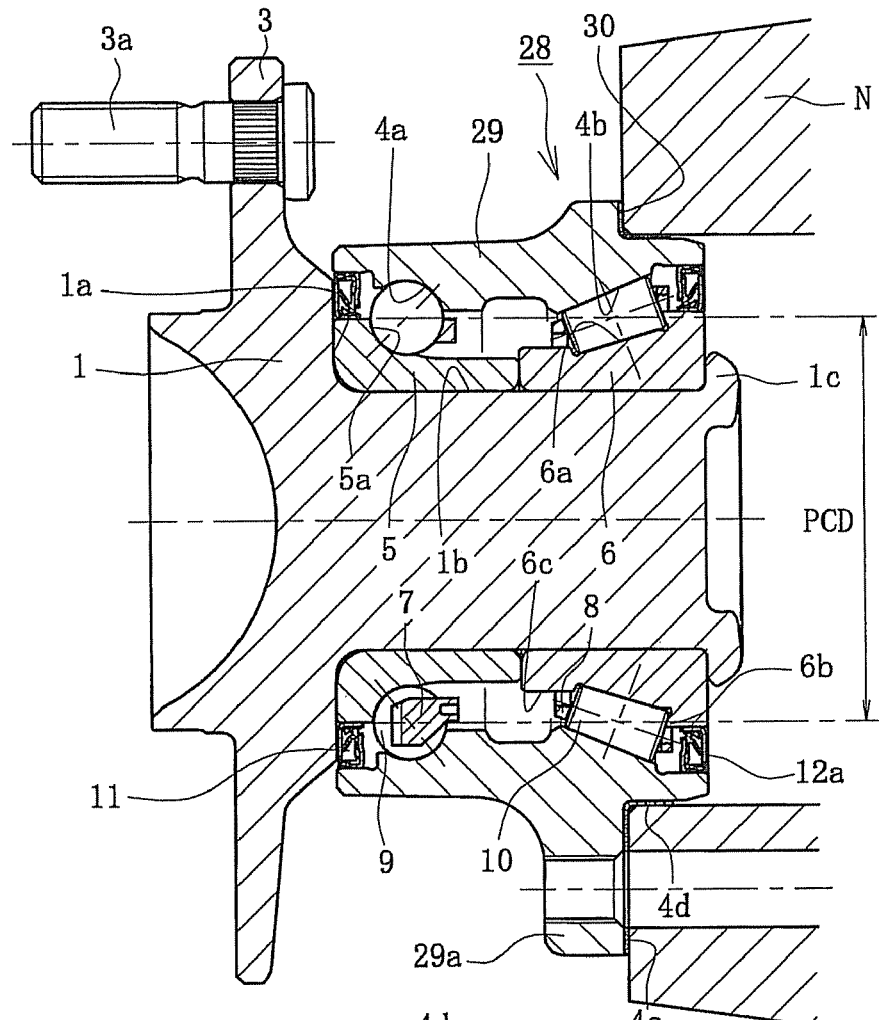
[Fig 12]
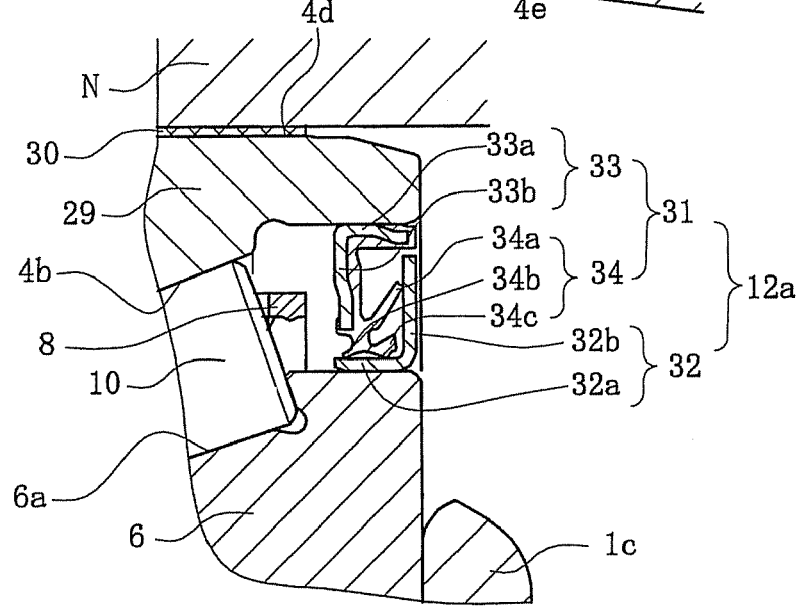

[ Fig 13 ]
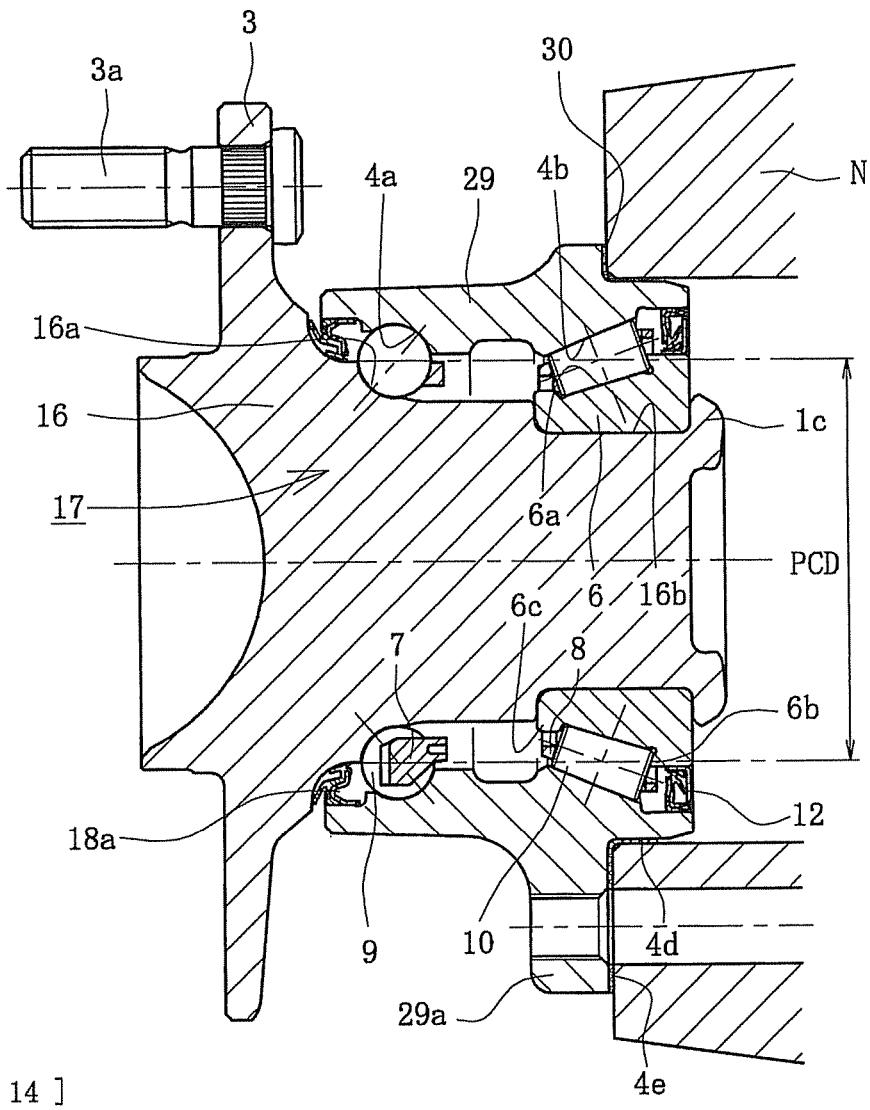
[ Fig 14 ]
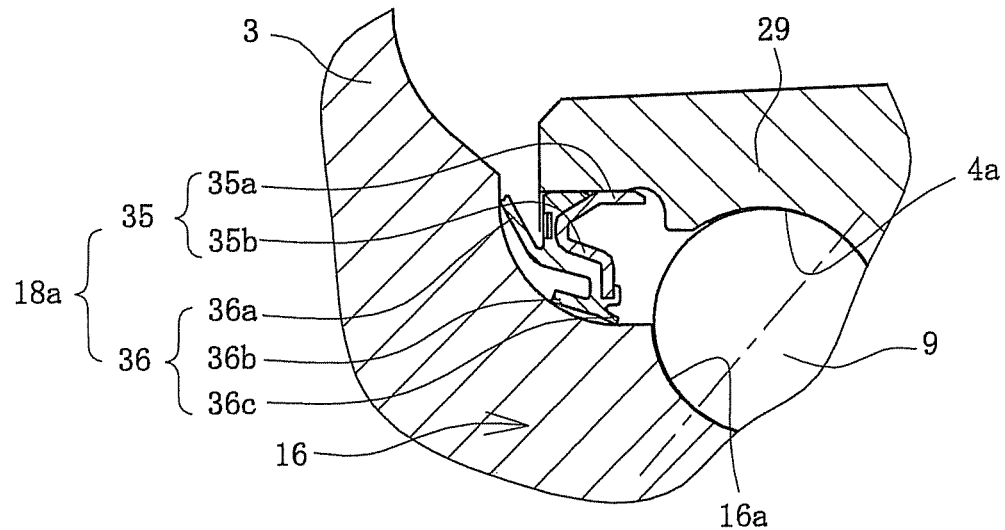

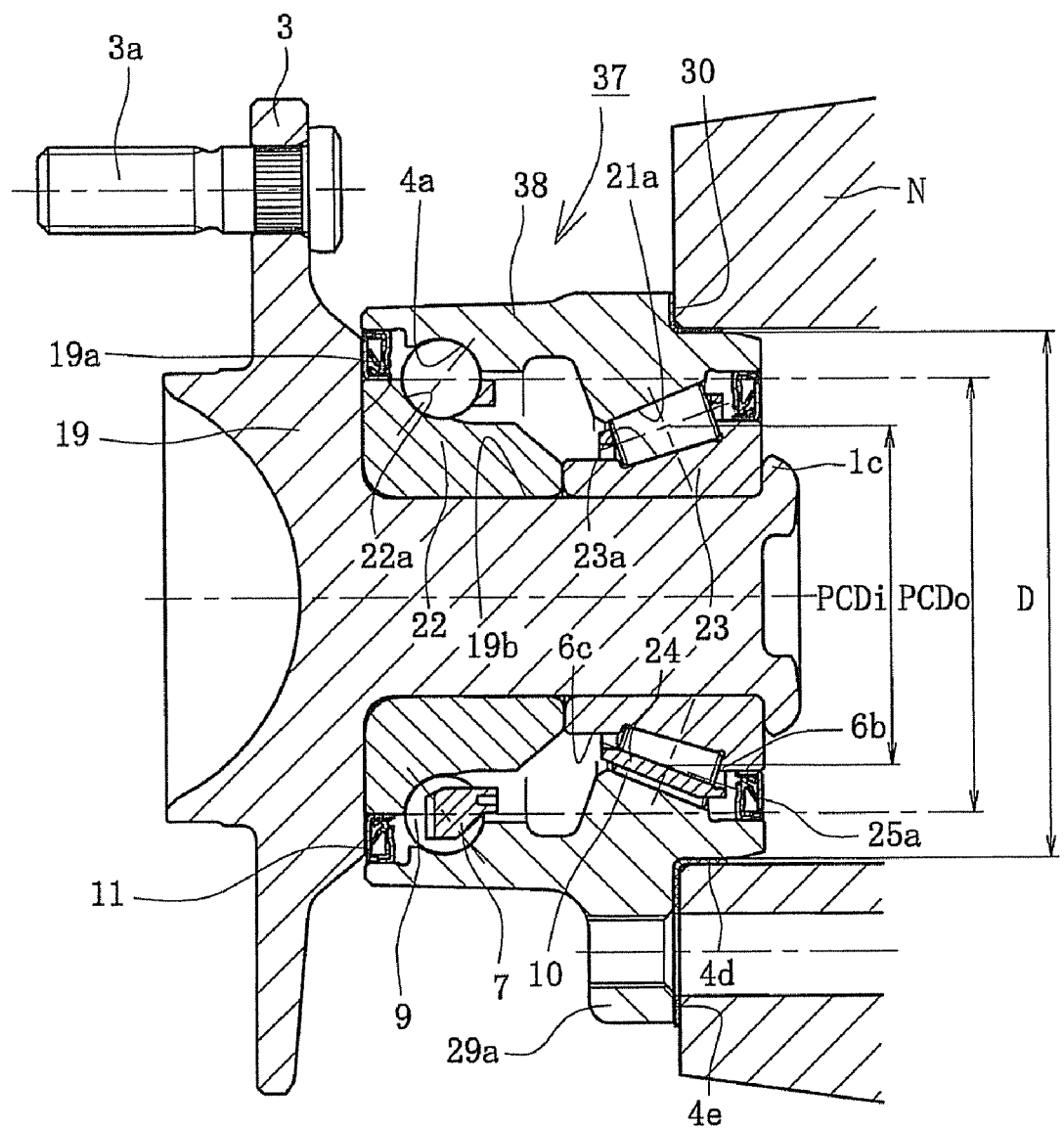
[ Fig 15 ]

[ Fig 16 ]
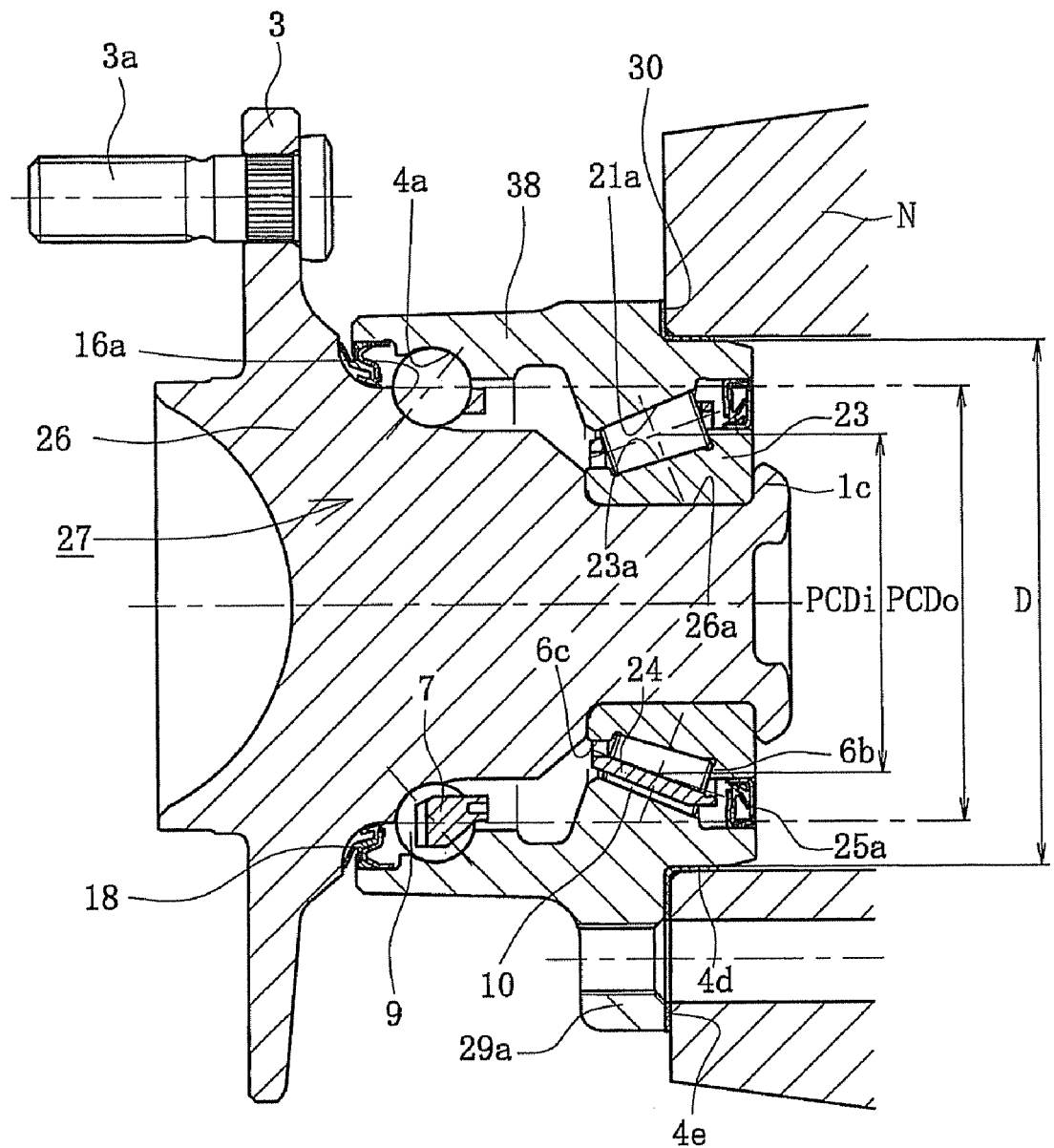

[Fig 17]
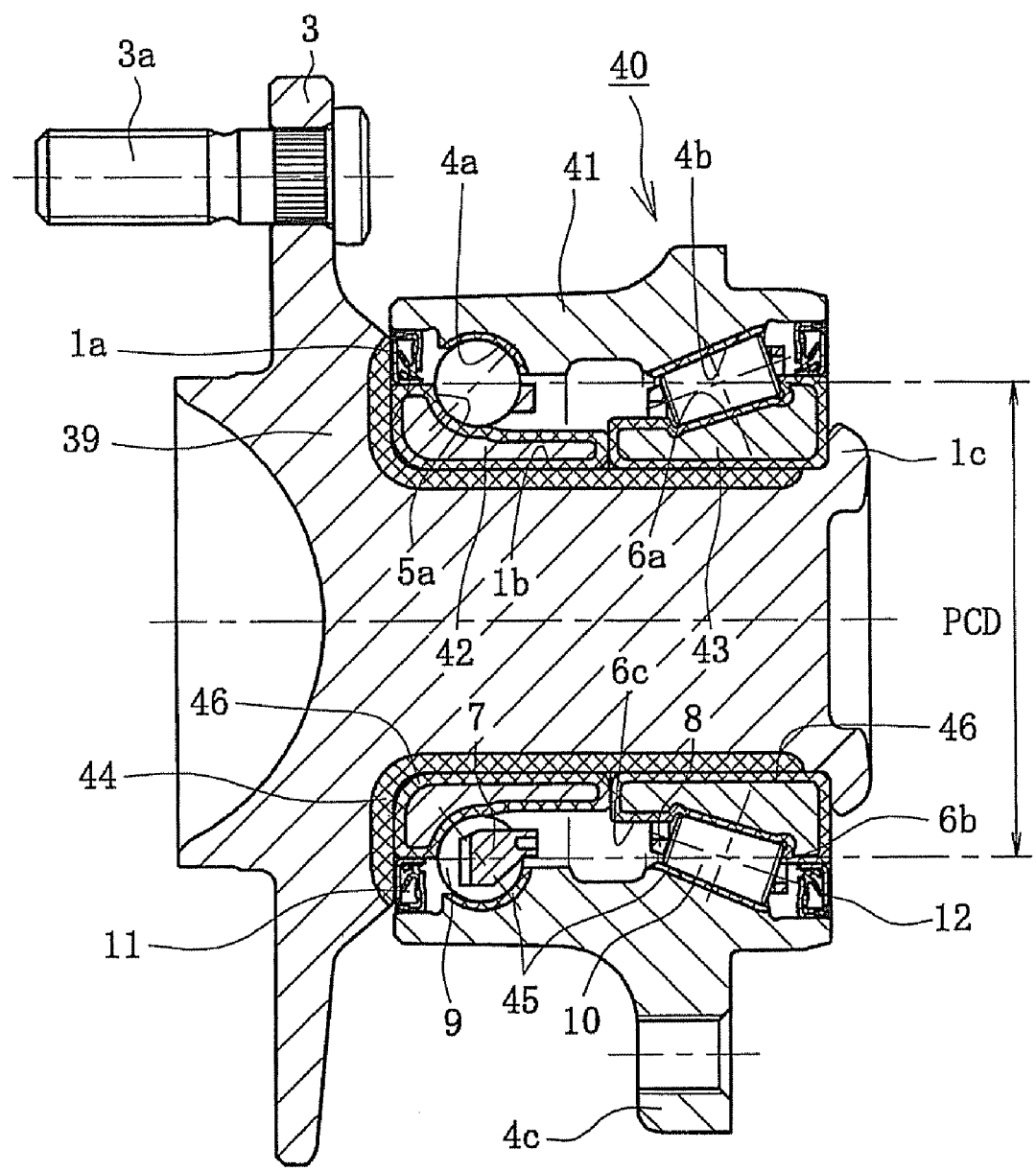

[Fig 18]
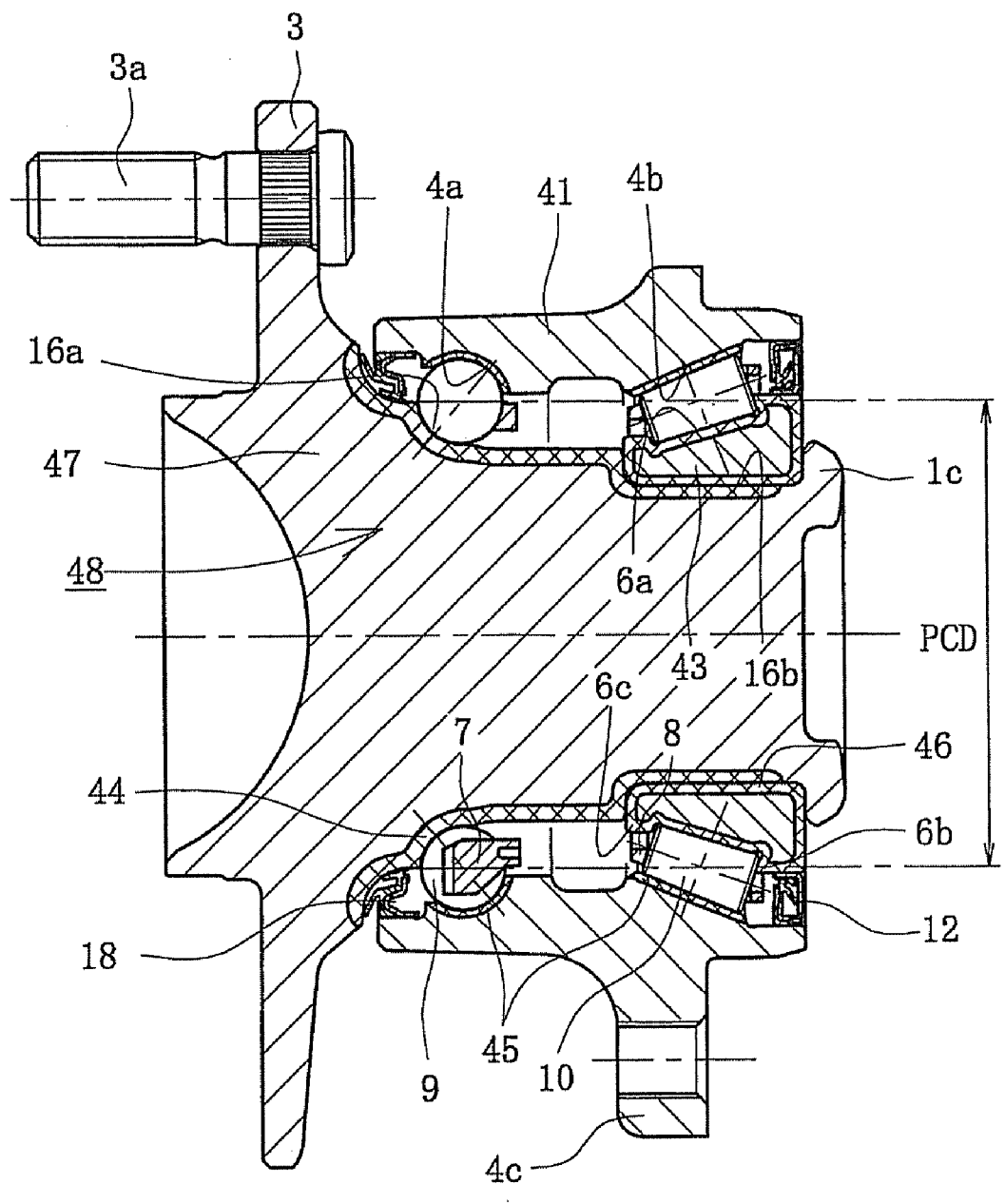

[Fig 19]
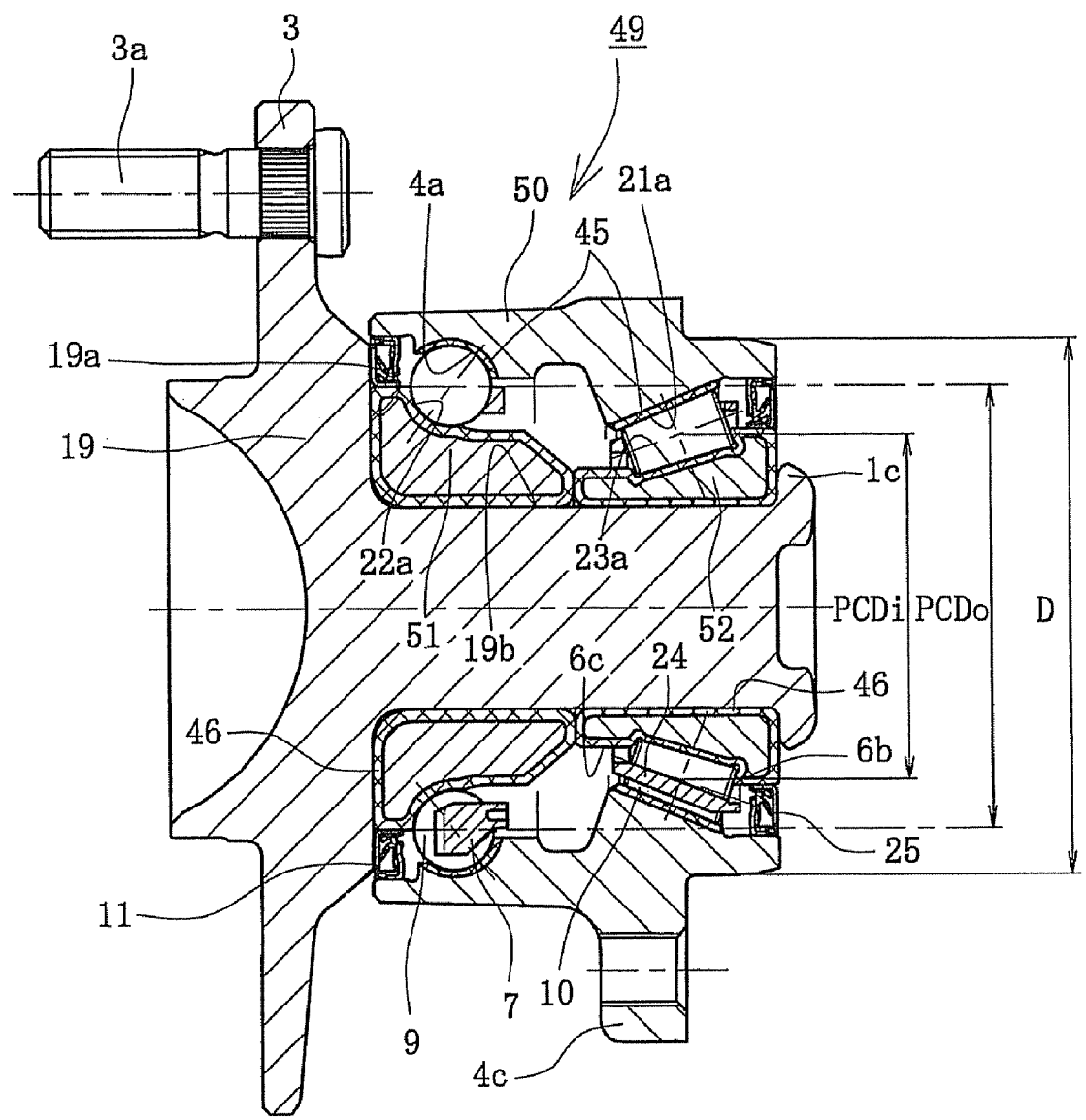

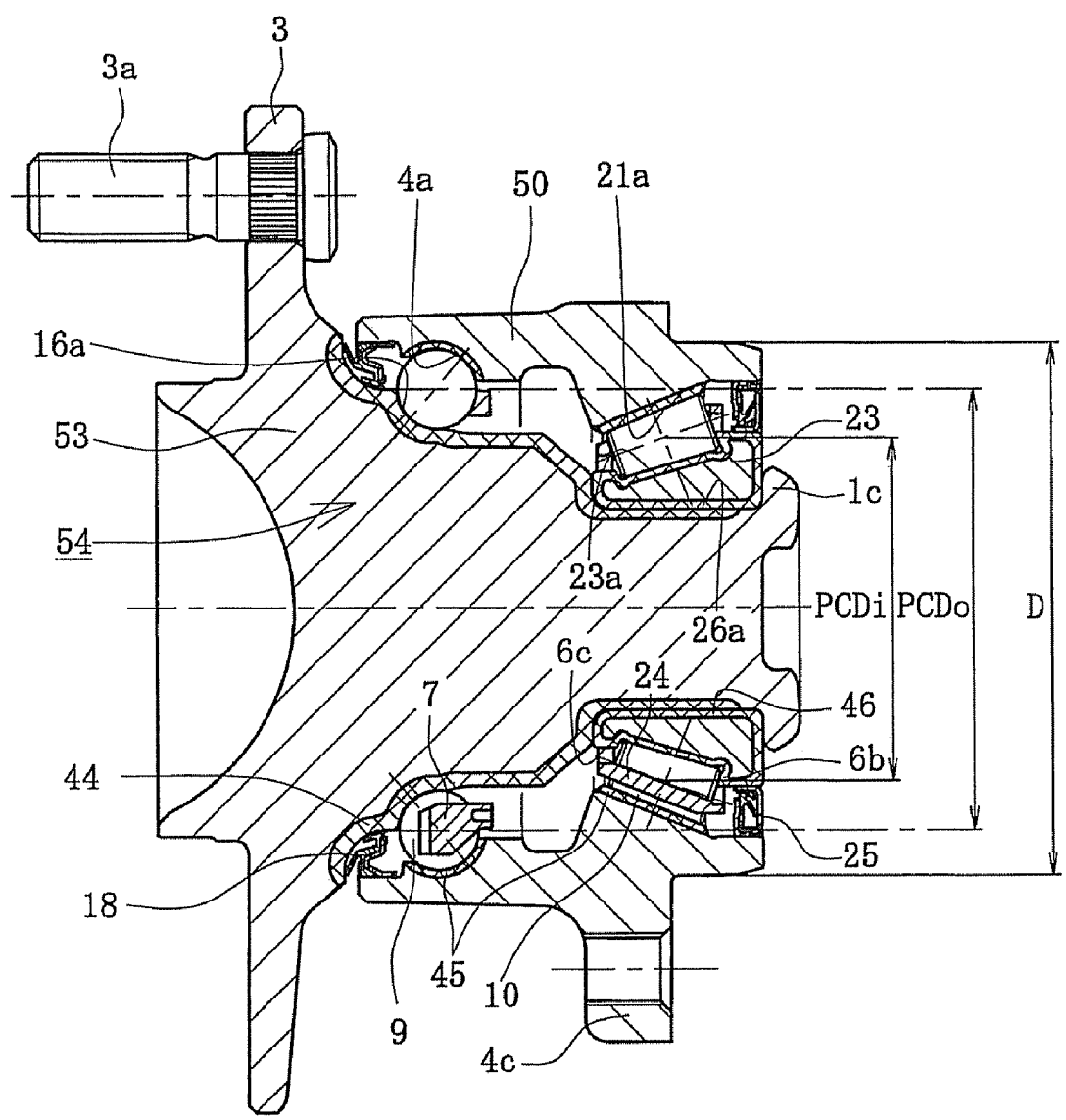
[ Fig 20 ]

[ Fig 21 ]
PRIOR ART
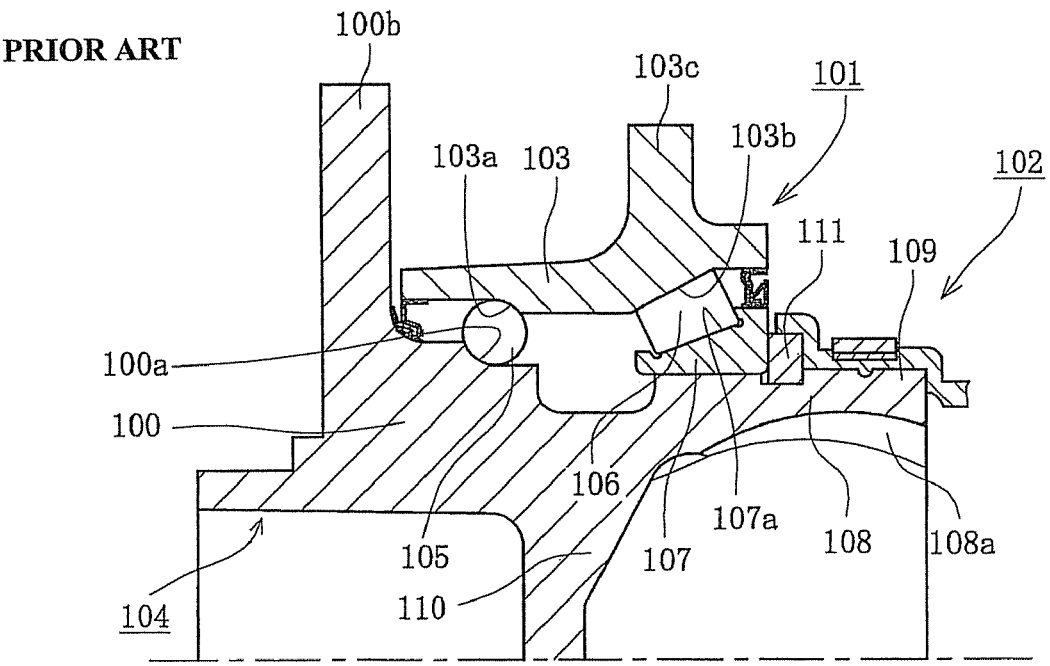
[ Fig 22 ]
PRIOR ART
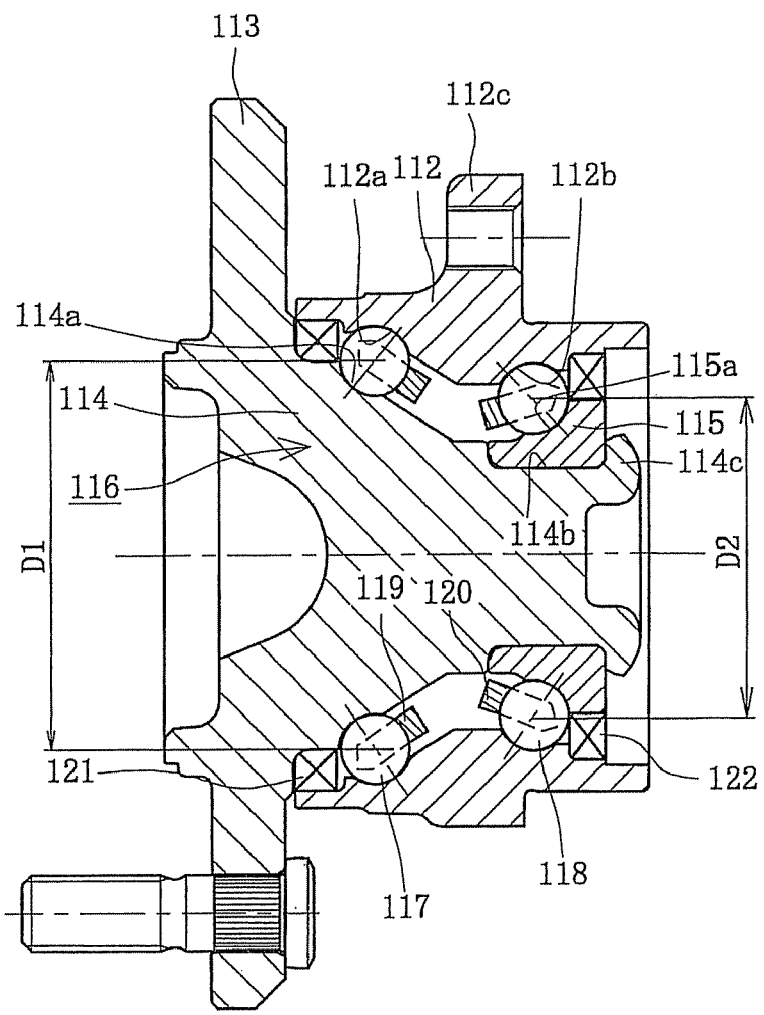

BEARING APPARATUS FOR A WHEEL OF VEHICLE

CROSS-REFERENCE TO RELATED APPLICATIONS

This application is a continuation of International Application No. PCT/JP2007/000108, filed Feb. 21, 2007, which claims priority to Japanese Application Nos. 2006-062868, filed Mar. 8, 2006; 2006-118270, filed Apr. 21, 2006; 2006-135403, filed May 15, 2006; 2006-135404, filed May 15; 2006, and 2006-178376, filed Jun. 28, 2006. The disclosures of the above applications are incorporated herein by reference.

FIELD

The present disclosure relates to a bearing apparatus to freely rotationally support a wheel of vehicle and, more particularly, to a vehicle wheel bearing apparatus that can simultaneously satisfy the antinomic requirements of reducing the weight and increasing the rigidity of the bearing apparatus.

BACKGROUND

Generally, the vehicle wheel bearing apparatus is used to freely rotationally support a wheel hub to mount the wheel, via a rolling bearing, for a driving wheel and a driven wheel. For structural reasons, generally an inner ring rotation type bearing is adopted for a driving wheel. Both inner ring and outer ring rotation type bearings are used for a driven wheel. Double row angular bearings are widely used in such a bearing apparatus. This is due to the fact that it has a desirable bearing rigidity, high durability against misalignment and small rotation torque for superior fuel consumption. On the other hand, double row tapered roller bearings are used for heavy weight vehicles such as off-road cars or trucks.

The vehicle wheel bearing apparatus is broadly classified into a structure of a first generation type where a wheel bearing of double row angular contact ball bearings is fitted between a knuckle, forming a part of a suspension, and a wheel hub. In a second generation type structure, a body mounting flange or a wheel mounting flange is formed directly on the outer circumference of an outer member. In a third generation type structure, one of the inner raceway surfaces is directly formed on the outer circumference of the wheel hub. In a fourth generation type structure, the inner raceway surfaces are formed directly on the outer circumferences of the wheel hub and the constant velocity universal joint.

The wheel bearing apparatus shown in FIG. 21 is a fourth generation type superior for its light weight and small size. It includes a unit of a wheel hub 100, a double row rolling bearing 101, and a constant velocity universal joint 102. The double row rolling bearing 101 has an outer member 103, an inner member 104, and a plurality of balls 105 and tapered rollers 106 contained between the outer and inner members 103, 104. In the descriptions below, the term "outer side" defines a side that is positioned outside of a vehicle body (left-hand side in drawings). The term "inner side" defines the side that is positioned inside of a vehicle body (right-hand side in drawings) when the bearing apparatus is mounted on the vehicle body.

The outer member 103 is formed with a body mounting flange 103c on its outer circumference. The body mounting flange 103c mounts on a knuckle (not shown) forming part of a suspension of the vehicle. Its inner circumference includes double row outer raceway surfaces 103a, 103b. A diameter of the outer side outer raceway surface 103a is set smaller than that of the inner side outer raceway surface 103b. The inner member 104 includes the wheel hub 100, an outer joint member 108 integrally formed with the wheel hub 100, and a separate inner ring 107 press-fit onto the outer joint member 108.

The wheel hub 100 is formed with a wheel mounting flange on its one end. The wheel mounting flange 100b mounts a wheel (not shown). The wheel hub outer circumference has an inner raceway surface 100a arranged opposite to the outer side outer raceway surface 103a of the double row outer raceway surfaces 103, 103b. The outer circumference of the inner ring 107 is formed with an inner raceway surface 107a arranged opposite to the inner side outer raceway surface 103b of the double row outer raceway surfaces 103a, 103b.

The constant velocity universal joint 102 includes the outer joint member 108 with a cup-shaped mouth portion 109 and a shoulder portion 110. The shoulder portion 110 forms a bottom portion of the mouth portion 109. The inner circumference of the outer joint member 108 is formed with curved track grooves 108a. The inner ring 107 is press-fit onto the outer circumference of the mouth portion 109 and axially immovably secured by a snap ring 111.

The plurality of balls 105 are freely rollably contained between the outer side outer and inner raceway surfaces 103a, 100a. The plurality of tapered rollers 106 are freely rollably contained between the inner side outer and inner raceway surfaces 103b, 107a. The pitch circle diameter of the outer side balls 105 is set smaller than that of the inner side tapered rollers 106. This enables the fundamental rated load of the inner side rolling elements, which a larger load is applied than a load applied to the outer side rolling elements, to be larger than the fundamental rated load of the outer side rolling elements. Thus, this enables the life of the outer side and inner side rolling elements to be substantially the same to each other and to obtain a smart design (see e.g. Japanese Laid-open Patent publication No. 91308/1999).

In such a wheel bearing apparatus, since the inner ring 107 is secured on the mouth portion 109 of the outer joint member 108, the size of the apparatus can be reduced in its axial direction. However, since the outer diameter of the outer member 103 is enlarged, not only is the reduction of weight of the wheel bearing apparatus hampered but also design modifications of related parts, such as a knuckle, are required. In order to solve such a problem, the wheel bearing apparatus shown in FIG. 22 has been proposed.

This wheel bearing apparatus is formed by a double row angular contact ball bearing with an outer member 112 formed with a body mounting flange 112a on its outer circumference. The body mounting flange 112c is mounted on a knuckle (not shown) of a vehicle. Its inner circumference surface has double row outer raceway surfaces 112a, 112b. An inner member 116 includes a wheel hub 114 formed with a wheel mounting flange 113 on one of its ends. The wheel mounting flange 113 mounts a wheel (not shown). The wheel hub outer circumference has an inner raceway surface 114a arranged opposite to the outer side outer raceway surface 112a of the double row outer raceway surfaces 112a, 112b. A cylindrical portion 114b axially extends from the inner raceway surface 114a. An inner ring 115, formed with an inner raceway surface 115a, is arranged opposite to the inner side outer raceway surface 112b of the double row outer raceway surfaces 112a, 112b. Double row balls 117, 118 are freely rollably contained between the outer raceway surfaces and inner raceway surfaces. Cages 119, 120 freely rollably hold the double row balls 117, 118.

The inner ring 115 is axially secured by a caulked portion 114c. The caulked portion 114c is formed by radially outwardly plastically deforming the end of the cylindrical portion 114b of the wheel hub 114. Seals 121, 122 are mounted within annular openings formed between the outer member 112 and the inner member 116. The seals 121, 122 prevent leakage of lubricating grease sealed within the bearing and the entering of rain water or dusts from the outside into the bearing.

In this wheel bearing apparatus, a pitch circle diameter D1 of the outer side row of balls 117 is set larger than a pitch circle diameter D2 of the inner side row of balls 118. Accordingly, the diameter of the inner raceway surface 114a of the wheel hub 114 is larger than that of the inner raceway surface 115a of the inner ring 115. The diameter of the outer side outer raceway surface 112a of the outer member 112 is larger than that of the inner side outer raceway surface 112b. In addition, the number of the outer side balls 117 is larger than that of the inner side balls 118. By setting the relation between the pitch circle diameters D1, D2 as D1>D2, it is possible to increase the rigidity of the wheel bearing apparatus not only in the case of running in a straight way but also in the case of running in a curved way and thus to extend the life of the wheel bearing apparatus (see e.g. Japanese Laid-open Patent publication No. 108449/2004).

SUMMARY

In the wheel bearing apparatus of the prior art, the pitch circle diameter D1 of the outer side row of balls 117 is set larger than the pitch circle diameter D2 of the inner side row of balls 118. Thus, the diameter of the inner raceway surface 114a of the wheel hub 114 is larger than that of the inner raceway surface 115a of the inner ring 115. Accordingly, it is possible to increase the rigidity of the outer side bearing row and to extend the life of the wheel bearing apparatus without increasing the size. However, in general the load applied to the inner side row of rolling elements is larger than that applied to the outer side row of rolling elements. Accordingly, in the wheel bearing apparatus, since the fundamental rated load of the inner side row of rolling elements is smaller than that of the outer side row of rolling elements, the life of the wheel bearing apparatus is shortened.

It is, therefore, an object of the present disclosure to provide a vehicle wheel bearing apparatus that can simultaneously solve the antinomic problems of reducing the weight and size of the bearing apparatus and of increasing the rigidity, strength and durability of the bearing apparatus.

To achieve the object, a vehicle wheel bearing apparatus is provided with an outer member formed with a body mounting flange on its outer circumference. The body mounting flange mounts on a knuckle of a vehicle. The outer member inner circumference includes double row outer raceway surfaces. An inner member includes a wheel hub formed with a wheel mounting flange on its one end. Its outer circumference includes a cylindrical portion. At least one inner ring is press-fit onto the cylindrical portion of the wheel hub. The inner ring is formed on its outer circumference with an inner raceway surface(s) arranged opposite to the double row outer raceway surfaces. Double row rolling elements are freely rollably contained between the outer raceway surfaces and inner raceway surfaces of the outer member and the inner members. Seals are mounted within annular openings formed between the outer member and the inner member. The inner ring(s) is axially secured relative to the wheel hub by a caulked portion. The caulked portion is formed by radially outwardly plastically deforming the end of the cylindrical portion of the wheel hub. The outer side rolling elements of the double row rolling elements are balls. The inner side rolling elements of the double row rolling elements are tapered rollers. The fundamental rated load of the inner side row of tapered rollers is set larger than that of the outer side row of balls.

According to the wheel bearing apparatus of the second or third generation type in the present disclosure, the double row rolling elements are provided. The inner ring is secured by the swing motion caulking. The outer side rolling elements of the double row rolling elements are balls. The inner side rolling elements of the double row rolling elements are tapered rollers. The fundamental rated load of the inner side row of tapered rollers is set larger than that of the outer side row of balls. Thus, it is possible to increase the rigidity of the inner side row of rolling elements and to keep the life of the bearing apparatus even though a load applied to the inner side row of rolling elements exceeds a load applied to the outer side row of rolling elements. Thus, it is possible to realize a useful design of the wheel bearing apparatus and to provide a wheel bearing apparatus having improved strength and durability.

The pitch circle diameter of the inner side row of tapered rollers is set the same as that of the outer side row of balls. Alternatively, the pitch circle diameter of the inner side row of tapered rollers is set smaller than that of the outer side row of balls. This enables the inner side outer diameter of the outer member to be set smaller and thus to reduce the size of the knuckle without lowering the fundamental rated load of the inner side row of rolling elements, which leads to the reduction of weight and size of the wheel bearing apparatus.

The number of the inner side row of tapered rollers is set larger than the number of outer side row of balls. This makes it possible to increase the rigidity of the inner side row of rolling elements. Thus, this keeps the life of the bearing apparatus, even though a load applied to the inner side row of rolling elements exceeds a load applied to the outer side row of rolling elements.

An electric insulating film layer is formed on contacting surfaces between the outer member and the knuckle. This makes it difficult to cause a potential difference between the steel contacting surfaces of the bearing apparatus and the light alloy of the knuckle. Thus, this prevents the generation of galvanic corrosion between the contacting surfaces even though any conductive liquid functioning as an electrolyte would adhere to the contacting surfaces and form a cell between the two.

At least one of the seals has a conductive sealing member. This prevents the generation of electric sparks between the rolling elements and the raceway surfaces even though the formation of a lubricating oil film between them is not sufficient. This further prevents the generation of electric corrosion owing to the electric sparks and the generation of noises in a radio mounted in the vehicle.

At least a rotational member of the outer member and the inner member is made of carbon steel including C of 0.60~0.80% by weight. It is formed at a predetermined portion with a hardened layer by high frequency induction quenching. This makes it possible to provide a vehicle wheel bearing apparatus that can simultaneously solve the antinomic problems of reducing the weight and size of the bearing apparatus and of increasing the rigidity, strength and durability of the bearing apparatus.

The rotational member is made of steel including C of 0.70~0.80% by weight, Si of 0.50~1.0% by weight, Mn of 0.10~2.0% by weight, Cr of 0.40~0.95% by weight, Al of less than 0.050% by weight, O of less than 0.0030% by weight, and the residue of Fe and inevitable impurities. This further improves the ease in machining and the rolling fatigue life.

An inner side cage for the tapered rollers is made of engineered plastic with superior mechanical strength, oil resistance and heat resistance. It has a pocket angle in the cage of 55~90° and a rolling coefficient γ larger than 0.94. This increases both the fundamental dynamic rated load and fundamental static rated load. Accordingly, this not only extends the rolling life of the bearing apparatus and improves the rigidity of bearing apparatus but also reduces the weight of cages as compared with steel cages and improves the self-lubricity and lowers the frictional coefficient. Accordingly, it is possible to suppress wear of the cages caused by contact with the outer member and to prevent torque loss at a rotational start time of the bearing.

A pair of inner rings is press-fit onto the cylindrical portion of the wheel hub. The inner diameter of the pair of inner rings is set the same to each other. This enables a straight configuration of the cylindrical portion of the wheel hub and thus makes its machining easy.

The outer side inner raceway surface is directly formed on the outer circumferential surface of the wheel hub. The cylindrical portion extends from the outer side inner raceway surface toward the inner side. The inner side inner ring is press-fit onto the cylindrical portion, via a predetermined interference. This further reduces the weight and size of the wheel bearing apparatus.

According to the vehicle wheel bearing apparatus of the present disclosure, it comprises an outer member formed with a body mounting flange on its outer circumference. The body mounting flange is mounted on a knuckle of a vehicle. Its inner circumferential surface has double row outer raceway surfaces. An inner member includes a wheel hub formed with a wheel mounting flange on one of its ends. Its outer circumference has a cylindrical portion. At least one inner ring is press-fit onto the cylindrical portion of the wheel hub. Inner raceway surfaces are formed on the outer circumference of the inner ring. The inner raceway surface(s) are arranged opposite to the double row outer raceway surfaces. Double row rolling elements are freely rollably contained between the outer raceway surfaces and inner raceway surfaces of the outer member and the inner members. Seals are mounted within annular openings formed between the outer member and the inner member. The inner ring(s) is axially secured relative to the wheel hub by a caulked portion. The caulked portion is formed by radially outwardly plastically deforming the end of the cylindrical portion of the wheel hub. Outer side rolling elements of the double row rolling elements are balls. The inner side rolling elements of the double row rolling elements are tapered rollers. The number of the inner side row of tapered rollers is set larger than the number of the outer side row of balls. The fundamental rated load of the inner side row of tapered rollers is set larger than that of the outer side row of balls. Accordingly, it is possible to increase the rigidity of the inner side row of rolling elements and to keep the life of the bearing apparatus, even though a load applied to the inner side row of rolling elements exceeds a load applied to the outer side row of rolling elements. Thus, it is possible to realize a useful design of the wheel bearing apparatus and to provide a wheel bearing apparatus with improved strength and durability.

A vehicle wheel bearing apparatus comprises a wheel hub formed with a wheel mounting flange on one of its ends. Its outer circumference has a cylindrical portion that extends from the wheel mounting flange. A wheel bearing is press-fit onto the cylindrical portion of the wheel hub. The wheel bearing includes an outer member with a body mounting flange formed on its outer circumference. The body mounting flange is to be mounted on a knuckle of a vehicle. Its inner circumference includes double row outer raceway surfaces. A pair of inner rings is formed with inner raceway surfaces on its outer circumference. The inner raceway surface is arranged opposite to the double row outer raceway surface. Double row rolling elements are freely rollably contained between the outer raceway surfaces and inner raceway surfaces. Seals are mounted within annular openings formed between the outer member and the inner member. The inner rings are axially secured relative to the wheel hub by a caulked portion. The caulked portion is formed by radially outwardly plastically deforming the end of the cylindrical portion of the wheel hub. In this wheel bearing apparatus, the outer side rolling elements of the double row rolling elements are balls. The inner side rolling elements of the double row rolling elements are tapered rollers. The number of the inner side row of tapered rollers is set larger than the number of the outer side row of balls. The fundamental rated load of the inner side row of tapered rollers is set larger than that of the outer side row of balls.

Further areas of applicability will become apparent from the description provided herein. The description and specific examples in this summary are intended for purposes of illustration only and are not intended to limit the scope of the present disclosure.

DRAWINGS

Additional advantages and features of the present disclosure will become apparent from the subsequent description and the appended claims, taken in conjunction with the accompanying drawings, wherein:

FIG. 1 is a longitudinal section view of a first embodiment of a vehicle wheel bearing apparatus of the present disclosure.

FIG. 2 is a longitudinal section view of a second embodiment of the vehicle wheel bearing apparatus.

FIG. 3 is a partial section view of FIG. 2.

FIG. 4 is a partial enlarged view of FIG. 3.

FIG. 5 is an explanatory cross-section view showing a range of circumferential movement of tapered rollers within pockets.

FIG. 6 is a graph showing results of life tests of a bearing.

FIG. 7 is a graph showing results of rigidity tests of a bearing.

FIG. 8 is a longitudinal section view of a third embodiment of the vehicle wheel bearing apparatus.

FIG. 9 is a longitudinal section view of a fourth embodiment of the vehicle wheel bearing apparatus.

FIG. 10 is a longitudinal section view of a fifth embodiment of the vehicle wheel bearing apparatus.

FIG. 11 is a longitudinal section view of a sixth embodiment of the vehicle wheel bearing apparatus.

FIG. 12 is a partial enlarged cross-section view of FIG. 11.

FIG. 13 is a longitudinal section view of a seventh embodiment of the vehicle wheel bearing apparatus.

FIG. 14 is a partially cross-section enlarged view of FIG. 13.

FIG. 15 is a longitudinal section view of an eighth embodiment of the vehicle wheel bearing apparatus.

FIG. 16 is a longitudinal section view of a ninth embodiment of the vehicle wheel bearing apparatus.

FIG. 17 is a longitudinal section view of a tenth embodiment of the vehicle wheel bearing apparatus.

FIG. 18 is a longitudinal section view of an eleventh embodiment of the vehicle wheel bearing apparatus.

FIG. 19 is a longitudinal section view of a twelfth embodiment of the vehicle wheel bearing apparatus.

FIG. 20 is a longitudinal section view of a thirteenth embodiment of the vehicle bearing apparatus.

FIG. 21 is a longitudinal section view of a prior art vehicle wheel bearing apparatus.

FIG. 22 is a longitudinal section view of a prior art vehicle wheel bearing apparatus.

DETAILED DESCRIPTION

Embodiments of the present disclosure will be hereinafter described with reference to the drawings.

FIG. 1 is a longitudinal section view of a first embodiment of the vehicle wheel bearing apparatus.

The vehicle wheel bearing apparatus shown in FIG. 1 is a second generation type structure and has a wheel hub 1 and a wheel bearing 2. The wheel hub 1 is integrally formed with a wheel mounting flange 3 on one of its ends. The flange 3 mounts a wheel (not shown). A cylindrical portion 1b axially extends from the wheel mounting flange 3, via a shoulder 1a. Hub bolts 3a are equidistantly arranged along the periphery of the wheel mounting flange 3.

The wheel bearing 2 is press-fit onto the cylindrical portion 1b. The bearing 2 abuts against the shoulder 1a of the wheel hub 1. The bearing 2 is axially secured by a caulked portion 1c. The caulked portion 1c is formed by plastically deforming the end of the cylindrical portion 1b. The wheel hub 1 is made of medium carbon steel including carbon of 0.40~0.80% by weight such as S53C. It is hardened by high frequency induction quenching so that a region including the shoulder portion 1a to the cylindrical portion 1b has a surface hardness of 58~64 HRC. The caulking portion 1c remains as is with its surface hardness after forging. Accordingly, the wheel hub 1 has a sufficient mechanical strength against rotary bending loads applied to the wheel mounting flange 3. The anti-fretting strength of the cylindrical portion 1b at a region press-fit by the wheel bearing 2 can be improved. The plastically deforming working of the caulking portion 1c can also be carried out without any micro cracks.

The wheel bearing 2 includes an outer member 4. The outer member 4 is integrally formed with a body mounting flange 4c on its outer circumference. The body mounting flange 4c is to be mounted on a knuckle (not shown) of a vehicle. The outer member inner circumference includes double row outer raceway surfaces 4a, 4b. Two inner rings 5, 6 are each formed on outer circumference with inner raceway surfaces 5a, 6a, respectively. The inner raceway surfaces 5a, 6a are opposite to the outer raceway surfaces 4a, 4b. A plurality of balls 9 and tapered rollers 10 are freely rollably contained between the outer and inner raceway surfaces 4a, 4b and 5a, 6a, via cages 7, 8. Seals 11, 12 are mounted within annular openings formed between the outer member 4 and inner rings 5, 6. The seals 11, 12 prevent leakage of grease contained in the bearing and the entering of rain water and dusts into the bearing from the outside.

The outer side raceway surfaces 4a, 5a are formed so that each has a circular arc configuration that the balls 9 angularly contact. Inner side raceway surfaces 4b, 6a are formed so that each has a tapered configuration that the tapered rollers 10 line contact. In addition, a larger flange 6b is formed on the inner side inner ring 6 at its larger diameter side of the inner raceway surface 6a to guide the tapered rollers 10. A smaller flange 6c is formed at its smaller diameter side to prevent falling out of the tapered rollers 10.

The outer member 4 is made of medium carbon steel including carbon of 0.40~0.80% by weight such as S53C. The double row outer raceway surfaces 4a, 4b are hardened by high frequency induction quenching to have a surface hardness of 58~64 HRC. The inner rings 5, 6, the balls 9 and the tapered rollers 10 are made of high carbon chrome steel such as SUJ2. They are hardened to their core by dip quenching to have a hardness of 58~64 HRC.

In this embodiment, a pitch circle diameter PCD of the outer side row of balls 9 and a pitch circle diameter PCD of the inner side row of tapered rollers 10 are set the same as each other. The number of the inner side row of tapered rollers 10 is set larger than the number of the outer side row of balls 9. That is, the outer side row of balls 9 are arranged equidistantly at a slight space in the circumferential direction. On the contrary, the inner side row of tapered rollers 10 are arranged at a close space toward each other. Accordingly, the rigidity of the inner side row of rolling elements can be increased. Thus, the fundamental rated load of the inner side row of rolling elements can be larger than that of the outer side row of rolling elements. Accordingly, it is possible to keep the life of the bearing apparatus even though a load applied to the inner side row of rolling elements exceeds a load applied to the outer side row of rolling elements. Thus, it is possible to realize a useful design of the wheel bearing apparatus and to provide a wheel bearing apparatus with improved strength and durability.

FIG. 2 is a longitudinal section view showing a second embodiment of the vehicle wheel bearing apparatus. FIG. 3 is a partial section view of FIG. 2. FIG. 4 is a partial enlarged section view of FIG. 3. FIG. 5 is an explanatory section view showing a range of circumferential movement of the tapered rollers within pockets. FIG. 6 is a graph showing results of life tests of a bearing. FIG. 7 is a graph showing results of rigidity tests of a bearing. Since this embodiment is only fundamentally different from the first embodiment in structures of the wheel hub and the inner side cage, the same reference numerals as those used in the first embodiment are also used in this embodiment.

The vehicle wheel bearing apparatus of this embodiment is a second generation type structure and includes a wheel hub 13 and a wheel bearing 14 secured on the wheel hub 13. The wheel hub 13 is made of medium carbon steel including carbon of 0.40~0.80% by weight such as S53C. It is formed on its inner circumference with a serration (or spline) 13a for torque transmission purposes. The wheel bearing 14 is press-fit onto the cylindrical portion 1b via a predetermined interference. It is axially secured by a caulked portion 1c. The caulked portion is formed by plastically deforming the end of the cylindrical portion 1b.

In this second embodiment, the pitch circle diameter of the inner side row of the tapered rollers 10 is enlarged by shifting a cage 15 as much as possible toward the outer member 4 as shown in FIG. 3. This increases the number of tapered rollers 10 without reducing the diameter of each tapered roller. The cage 15 is integrally molded from engineered plastic, for example of PA (polyamide) 46, PA 66, PPS (polyphenylene sulfide), PEEK (polyether ether ketone) etc. The cage 15 has a smaller side annular portion 15a, a larger side annular portion 15b, and a plurality of column portions 15c axially connecting the smaller side annular portion 15a and the larger side annular portion 15b.

The engineered plastic includes both the general purpose type engineered plastic and the super engineered plastic. Representative examples are shown below, however, the present disclosure is not limited to there examples.

Examples of the general purpose type engineered plastic are PC (polycarbonate), PA (polyamide) 6, POM (polyacetal), m-PPE (denatured polyphenylene ether), PBT (polybutylene terephthalate), GF-PET (glass fiber reinforced-polyethylene terephthalate), and UHMW-PE (ultra high molecular weight-polyethylene)

Examples of the super engineered plastic: are PSF (polysulfone), PES (polyether sulfone), PAR (polyarylate), PAI (polyamide imide), PEI (polyether imide), LCP (liquid crystal polymer), TPI (thermoplastic polyimide), PBI (polybenzimidazole), TPX (polymethyl bendene), PCT (poly1,4-cyclohexane dimethyl terephthalate), PA6T (polyamide 6T), PA9T (polyamide 9T), PA 11, 12 (polyamide 11, 12), fluoroplastic, and PPA (polyphthalamide).

It is preferable to use GF reinforced material of PA 46 for a vehicle of relatively heavy weight. GF reinforced material of PA 66 is used for a vehicle of relatively light weight.

As shown in FIG. 4, pocket angle $\theta 1$ formed by adjacent surfaces $15d$ of adjacent column portions $15c$ is set within a range from a minimum pocket angle $\theta 1_{min}$ 55° to a maximum pocket angle $\theta 1_{max}$ 90°. "Pocket" means a space formed by adjacent column faces $15d$, $15d$. In a general tapered roller bearing having cages separated from the outer member, the pocket angle is usually between 25~50°. In this specification, the "pocket angle" is defined as an angle formed by two tangential lines at contacting points between one tapered roller 10 and the adjacent guiding surfaces $15d$ of the adjacent column portions $15c$.

A rolling coefficient γ exceeding 0.94 can be achieved by setting the pocket angle $\theta 1$ somewhat large. Good contacting condition between the tapered roller 10 and the guiding surfaces $15d$ can be obtained by setting the minimum pocket angle $\theta 1_{min}$ at more than 55°. When the minimum pocket angle $\theta 1$ is less than 55°, the contact condition between the tapered roller 10 and the guiding surfaces $15d$ would be detracted. In a typical tapered roller bearing with prior art cages, the rolling coefficient γ (packing rate of rollers) defined by a formula below is usually designed less than 0.94 in order to obtain a suitable cage columns strength and smooth rotation of the bearing:

$$\text{Rolling coefficient } \gamma = (Z \times Da)/\pi PCD$$

wherein Z is the number of rollers, and Da is an average diameter of rollers.

If simply trying to increase the rolling coefficient γ while keeping the pocket dimension of the cage as it is, the cage column would be thin and thus a sufficient strength of the columns cannot be obtained. In order to increase the containing capacity for rollers without reducing the rigidity and strength of the cages and additionally to have a rolling coefficient γ exceeding 0.94 (γ>0.94) while suppressing increases of the dragging torque of cages, good contact condition cannot be confirmed without setting the pocket angle at 55° or more. On the other hand, the reason why the maximum pocket angle $\theta 1_{max}$ is set at 90° or less is that a radial urging force would be increased and thus there is a risk that a smooth rotation of the bearing cannot be obtained if self-lubricating plastic material would be used as cage member when the maximum pocket angle $\theta 1_{max}$ is set larger than 90°.

It is designed so that a predetermined gap is formed between the circumferential surface of the tapered roller 10 and the surfaces $15d$ of the columns $15c$. An amount of the gap is set so that the adjacent tapered rollers 10 cannot contact each other even if the rollers 10 are moved in either direction.

The applicant has made one example of a wheel bearing in accordance with the present disclosure that rolling coefficient γ=0.95 and the number of rollers Z=25. It was compared to a prior art wheel bearing having a rolling coefficient γ=0.88 and the number of rollers Z=23. According to a calculation, it is proposed that the wheel bearing of the present disclosure can have 7% increase of the fundamental dynamic rated load C and a 9% increase of the fundamental static rated load CO as compared with those of the prior art wheel bearing. With the increase of the fundamental dynamic rated load C and the fundamental static rated load CO in the present disclosure, a 20% improvement of the rolling life of the bearing (calculated value) and a 7% improvement of the bearing rigidity (calculated value) can be achieved as described with respect to embodiments below.

Results of the bearing life test and the bearing rigidity test with respect to a wheel bearing made in accordance with the present disclosure and a prior art wheel bearing are shown in FIGS. 6 and 7, respectively.

After carrying out the bearing life test for a bearing intended for heavy duty running, the bearing life of the wheel bearing made in accordance with the present disclosure exhibited about 3.2 times the calculated bearing life of the prior art.

On the other hand, the prior art bearing life was about 2.3 times its calculated bearing life. Accordingly, it is confirmed that the wheel bearing has extended the bearing life as compared with the prior art wheel bearing.

As a result of the bearing rigidity test, it is confirmed that a 7% increase of the bearing rigidity of the present disclosure has been attained as compared with the wheel bearing of the prior art.

The bearing rigidity test was carried out by securing a loading arm onto the wheel mounting flange, by applying an axial load (simulating the moment load during corner running) to a tire radial position of a real vehicle, by measuring the displacement of the wheel mounting flange and finally by converting the displacement of the wheel mounting flange to its inclination.

The specifications of the wheel bearings of the present disclosure and the prior art were the same other than the cages and the number of tapered rollers. In addition the configuration of parts and the pre-load of the bearing were also the same between them.

Engineered plastics such as PA 46, PA 66, PPS, PEEK etc. are used as material for the cage 15, however these plastics or other engineered plastics reinforced by glass fiber or carbon fiber may also be used, if necessary.

FIG. 8 is a longitudinal section view of a third embodiment of the vehicle wheel bearing apparatus. This embodiment is only fundamentally different from the first embodiment in the structures of the wheel hub. Thus, the same reference numerals as those used in the first embodiment are also used in this embodiment.

The wheel bearing apparatus of this embodiment is a third generation type for a driven wheel. The apparatus includes the outer member 4, an inner member 17, including a wheel hub 16, and the inner ring 6 press-fit onto a cylindrical portion $16b$ of the wheel hub 16. The wheel hub 16 is formed on its outer circumferential surface with an outer side inner raceway surface $16a$. It is arranged opposite to the outer raceway surface $4a$. The wheel hub 16 has a cylindrical portion $16b$ that axially extends from the inner raceway surface $16a$. The inner ring 6 is press-fit onto the cylindrical portion $16b$, via a predetermined interference, and axially secured by the caulked portion $1c$.

Seals 18, 12 are mounted within annular openings formed between the outer member 4 and the wheel hub 16 and inner ring 6 to prevent leakage of grease contained in the bearing and rain water and dusts from entering into the bearing from the outside.

The wheel hub 16 is made of medium carbon steel including carbon of 0.40~0.80% by weight such as S53C. It is hardened by high frequency induction quenching so that a region including a seal land portion, on which the seal 18 sliding contacts, and inner raceway surface 16a and the cylindrical portion 16b have a surface hardness of 58~64 HRC.

Similarly to the previous embodiments, also in this embodiment, a pitch circle diameter PCD of the outer side row of balls 9 and a pitch circle diameter PCD of the inner side row of tapered rollers 10 are set the same as each other. The number of the inner side row of tapered rollers 10 is set larger than the number of the outer side row of balls 9. Accordingly, it is possible to increase the rigidity of the inner side row of rolling elements and thus keep the life of the bearing apparatus even though a load applied to the inner side row of rolling elements exceeds a load applied to the outer side row of rolling elements.

FIG. 9 is a longitudinal section view of a fourth embodiment of the vehicle wheel bearing apparatus. This embodiment is only fundamentally different from the first embodiment (FIG. 1) in the pitch circle diameters of both rows of rolling elements. The same reference numerals as those used in the first embodiment are also used in this embodiment.

The wheel bearing apparatus of this embodiment is a second generation type for a driven wheel. It includes a wheel hub 19 and a wheel bearing 20 secured on the wheel hub 19. The wheel hub 19 is integrally formed with the wheel mounting flange 3 at its outer side end. The wheel hub 19 has a cylindrical portion 19b that axially extends from the wheel mounting flange 3, via a shoulder portion 19a. The wheel bearing 20 is press-fit onto the cylindrical portion 19b via a predetermined interference. It is axially secured by the caulked portion 1c that is formed by plastically deforming the end of the cylindrical portion 19b.

The wheel bearing 20 has an outer member 21 formed with a body mounting flange 4c on its outer circumference. Its inner circumferential surface has double row outer raceway surfaces 4a, 21a. Two inner rings 22, 23 are formed with inner raceway surfaces 22a, 23a on their outer circumferential surfaces. The inner raceway surfaces 22a, 23a are arranged opposite to the double row outer raceway surfaces 4a, 21a. A plurality of balls 9 and tapered rollers 10 are freely rollably contained between the outer and inner raceway surfaces 4a, 22a; 21a, 23a, via cages 7, 24. Seals 11, 25 are mounted within annular openings formed between the outer member 21 and the two inner rings 22, 23. The seals 11, 25 prevent leakage of grease contained in the bearing and rain water and dusts from entering into the bearing from the outside.

The outer member 21 is made of medium carbon steel including carbon of 0.40~0.80% by weight such as S53C. The double row outer raceway surfaces 4a, 21a are hardened by high frequency induction quenching to have a surface hardness of 58~64 HRC. In addition the inner rings 22, 23 are made of high carbon chrome bearing steel such as SUJ 2. They are hardened to their cores by dip quenching to have a hardness of 58~64 HRC.

In this embodiment, a pitch circle diameter PCDi of the inner side row of tapered rollers 10 is set smaller than a pitch circle diameter PCDo of the outer side row of balls 9. The number of the inner side row of tapered rollers 10 is set larger than the number of the outer side row of balls 9. This enables the inner side outer diameter D of the outer member 21 to be small. Accordingly, this reduces the knuckle size without reducing the fundamental rated load of the inner side row of rolling elements. Thus, this reduces the weight and size of the wheel bearing apparatus. In addition, it is possible to make the cylindrical portion 19b with a straight cylinder. Thus, this improves the workability of the wheel hub 19 even though a difference in the pitch circle diameters PCDo and PCDi occurs by making the thickness of the outer side inner ring 22 larger corresponding to the enlargement of the pitch circle diameter PCDo of the outer side row of balls 9.

FIG. 10 is a longitudinal section view of a fifth embodiment of the vehicle wheel bearing apparatus. This embodiment is only fundamentally different from the fourth embodiment (FIG. 9) in the structure of the wheel hub. The same reference numerals as those used in the fourth embodiment are also used in this embodiment.

The wheel bearing apparatus of this embodiment is a third generation type for a driven wheel. It includes an outer member 21 and an inner member 27 including a wheel hub 26 and an inner ring 23. The inner ring 23 is press-fit onto a cylindrical portion 26a of a wheel hub 26. The wheel hub 26 is formed on its outer circumference with an outer side inner raceway surface 16a arranged opposite to the outer side outer raceway surface 4a. The wheel hub 26 has a cylindrical portion 26a that axially extends from the inner raceway surface 16a. The inner ring 23 is press-fit onto the cylindrical portion 26a via a predetermined interference and axially secured by the caulked portion 1c.

Seals 18, 25 are mounted within annular openings formed between the outer member 21 and the wheel hub 26 and inner ring 23. The seals 18, 25 prevent leakage of grease contained in the bearing and rain water and dusts from entering into the bearing from the outside.

The wheel hub 26 is made of medium carbon steel including carbon of 0.40~0.80% by weight such as S53C. It is hardened by high frequency induction quenching so that a region including a seal land portion, on which the seal 18 sliding contacts, inner raceway surface 16a and the cylindrical portion 26a have a surface hardness of 58~64 HRC.

In this embodiment, a pitch circle diameter PCDi of the inner side row of tapered rollers 10 is set smaller than a pitch circle diameter PCDo of the outer side row of balls 9. The number of the inner side row of tapered rollers 10 is set larger than the number of the outer side row of balls 9. This enables the inner side outer diameter D of the outer member 21 to be smaller. Accordingly, this reduces the knuckle size without reducing the fundamental rated load of the inner side row of rolling elements. Thus, this reduces the weight and size of the wheel bearing apparatus. Accordingly, it is possible to increase the rigidity of the inner side row of the rolling elements and thus keep the life of the bearing apparatus even though a load applied to the inner side row of rolling elements exceeds a load applied to the outer side row of rolling elements.

FIG. 11 is a longitudinal section view of a sixth embodiment of the vehicle wheel bearing apparatus. FIG. 12 is a partially enlarged view of FIG. 11. This embodiment is only fundamentally different from the first embodiment (FIG. 1) in structures of the outer member and the seals. The same reference numerals as those used in the first embodiment are also used in this embodiment.

The vehicle wheel bearing apparatus for a driven wheel of this embodiment is a second generation type. It includes the wheel hub 1 and a wheel bearing 28 secured on the wheel hub 1. The wheel bearing 28 is press-fit onto the cylindrical portion 1b. The wheel bearing 28 abuts against the shoulder 1a of the wheel hub 1 via a predetermined interference. It is axially secured by a caulked portion 1c that is formed by plastically deforming the end of the cylindrical portion 1b.

The wheel bearing 28 includes an outer member 29 integrally formed with a body mounting flange 29 on its outer circumferential surface. The body mounting flange 29a is to be mounted on a knuckle N of a vehicle. The outer member inner circumference includes double row outer raceway surfaces 4a, 4b. Two inner rings 5, 6 are each formed on their outer circumference with inner raceway surfaces 5a, 6a, respectively. The inner raceway surfaces 5a, 6a are opposite to the double row outer raceway surfaces 4a, 4b. A plurality of balls 9 and tapered rollers 10 are freely rollably contained between the outer and inner raceway surfaces 4a, 4b and 5a, 6a, via cages 7, 8. The outer member 29 is made of medium carbon steel including carbon of 0.40~0.80% by weight such as S53C. The double row outer raceway surfaces 4a, 4b are hardened by high frequency induction quenching to have a surface hardness of 58~64 HRC. Seals 11, 12a are mounted within annular openings formed between the outer member 29 and the two inner rings 5, 6. The seals 11, 12a prevent leakage of grease contained in the bearing and rain water and dusts from entering into the bearing from the outside.

In this embodiment, the pitch circle diameter PCD of the outer side row of balls 9 and a pitch circle diameter PCD of the inner side row of tapered rollers 10 are set the same as each other. Accordingly, the rigidity of the inner side row of rolling elements can be increased and the fundamental rated load of the inner side row of rolling elements can be larger than that of the outer side row of rolling elements. Thus, it is possible to keep the life of the bearing apparatus even though a load applied to the inner side row of rolling elements exceeds a load applied to the outer side row of rolling elements. Thus, it is possible to realize a useful design of the wheel bearing apparatus and to provide a wheel bearing apparatus with improved strength and durability.

Additionally in this embodiment, the knuckle N is made of a light alloy such as aluminum alloy or magnesium alloy. The outer member 29 abuts against the knuckle N. It is formed with an electrically insulating film layer 30. The film layer 30 extends over a region including an inner side outer circumferential surface 4d of the outer member 29 and an inner side end face 4e of the body mounting flange 29a. The knuckle N is fit onto the outer circumferential surface 4d. The film layer 30 may be a plated layer having thereon a coating layer or a single coating layer.

The coating layer may be a synthetic resin layer or a painted film. For example, a coating layer of low temperature thermosetting type can be formed on a plated layer of chromate film when the film layer 30 is a plated layer on which a coating layer is formed. A coating agent of a one-liquid low temperature thermosetting type is used for the low temperature thermosetting type coating. The film layer 30 may be a single coating layer formed by electrostatic powder painting. Film layers used in electrostatic powder painting may be epoxy-powder paint, acrylic paint, solvent type baking acrylic paint, and aminoalkyd resin paint etc. The provision of such a film layer or coating layer makes it difficult to cause a potential difference between the steel contacting surfaces of the bearing apparatus and the light alloy knuckle. Thus, this prevents the generation of galvanic corrosion between the contacting surfaces even though any conductive liquid functioning as an electrolyte would adhere to the contacting surfaces and form a cell between the two.

In addition, the seal 12a comprises a composite seal or pack seal including an annular sealing plate 31 and a slinger 32. Each has an L-shaped cross section and is arranged opposite to each other as shown in the enlarged view of FIG. 12. The annular sealing plate 31 includes a metal core 33 fit into the end of the outer member 29. Sealing member 34 is integrally adhered to the metal core via vulcanized adhesion. The sealing member 34 includes a side lip 34a and a pair of radial lips 34b, 34c.

The metal core 33 is made of austenitic-stainless steel sheet (JIS SUS 304 etc.) or preserved cold rolled steel sheet (JIS SPCC etc.). It is formed to have a generally annular configuration by a plastic deformation process such as press working, drawing or barring. The metal core 33 has a cylindrical portion 33a, and a standing portion 33b that extends radially inward from the cylindrical portion 33a. The sealing member 34 is formed of conductive synthetic rubber material such as nitrile rubber with mingled conductive powder, such as carbon. This causes electrical conduction between the outer member 29 and the inner ring 6. Thus, this makes it difficult to cause a potential difference between the two. Preferably, the conductive rubber material has a volume intrinsic resistivity less than $30 \times 10^3$ Ωcm.

The slinger 32 is made of austenitic-stainless steel sheet (JIS SUS 304 etc.) or preserved cold rolled steel sheet (JIS SPCC etc.). It is formed in a generally annular configuration by plastic deformation process such as press working, drawing or barring. The slinger includes a cylindrical portion 32a and a standing portion 32b that extends radially outward from the cylindrical portion 32a.

In the wheel bearing apparatus of this embodiment, since the seal 12a is made of conductive material, an electric current between the outer member 29 and the inner ring 6 can flow through the seal 12a. Static electric caused by a tire flows to the outer member 29 via the wheel hub 1, inner wheel 6 and seal 12a. Further, it flows to the knuckle N via knuckle securing bolts (not shown) and is finally discharged to the body of the vehicle. This prevents the generation of electrical sparks between the rolling elements 9, 10 and the raceway surfaces of the outer member 29 and the inner rings 5, 6 even though the formation of a lubricating oil film between them is not sufficient. This further prevents the generation of electric corrosion owing to the electric sparks and the generation of noise in the radio mounted in the vehicle.

FIG. 13 is a longitudinal section view of a seventh embodiment of the vehicle wheel bearing apparatus. FIG. 14 is a partially enlarged view of FIG. 13. This embodiment is only fundamentally different from the third embodiment (FIG. 8) in structures of the outer member and seal. Thus, the same reference numerals as those used in the third embodiment are also used in this embodiment.

The wheel bearing apparatus of this embodiment is a third generation type for a driven wheel. It includes the outer member 29 and the inner member 17 with the wheel hub 16. The inner ring 6 is press-fit onto a cylindrical portion 16b of the wheel hub 16. Seals 18a, 12 are mounted within annular openings formed between the outer member 29 and the wheel hub 16 and inner ring 6 to prevent leakage of grease contained in the bearing and rain water and dusts from entering into the bearing from the outside.

Also in this embodiment, a pitch circle diameter PCD of the outer side row of balls 9 and a pitch circle diameter PCD of the inner side row of tapered rollers 10 are set the same as each other. Accordingly, it is possible to reduce the weight and size of the bearing apparatus and to increase the rigidity of the inner side row of rolling elements. Thus, this keeps the life of the bearing apparatus even though a load applied to the inner side row of rolling elements exceeds a load applied to the outer side row of rolling elements.

In addition, the outer side seal 18a includes a conductive metal core 35 and a conductive sealing member 36 integrally adhered to the metal core 35, via vulcanized adhesion as shown in FIG. 14. The metal core 35 is made of austenitic-stainless steel sheet (JIS SUS 304 etc.) or preserved cold rolled steel sheet (JIS SPCC etc.). It is formed with a generally annular configuration by a plastic deformation process such as press working. The metal core 35 has a cylindrical portion 35a and a standing portion 35b that extends radially inward from the cylindrical portion 35a. The sealing member 36 is formed of conductive synthetic rubber material such as nitrile rubber with mingled conductive powder such as carbon. The sealing member 36 has a side lip 36a and a pair of radial lips 36b, 36c in sliding contact with the base of the wheel mounting flange. Thus, an electric current between the outer member 29 and the wheel hub 16 can flow through the seal 18a to the body of the vehicle. Accordingly, similarly to the sixth embodiment (FIG. 11), it is possible to prevent the generation of electric corrosion on the raceway surfaces 4a, 16a and the generation of noise in the radio mounted in the vehicle.

FIG. 15 is a longitudinal section view of an eighth embodiment of the vehicle wheel bearing apparatus. This embodiment is only fundamentally different from the fourth embodiment (FIG. 9) in structures of the outer member and seal. Thus, the same reference numerals as those used in the fourth embodiment are also used in this embodiment.

The wheel bearing apparatus of this embodiment is a second generation type for a driven wheel. It includes the wheel hub 19 and a wheel bearing 37 secured onto the wheel hub 19. The wheel bearing 37 is press-fit onto the cylindrical portion 19b, abutting against the shoulder 19a of the wheel hub 19, via a predetermined interference. It is axially secured by the caulked portion 1c that is formed by plastically deforming the end of the cylindrical portion 19b.

The wheel bearing 37 includes an outer member 38 formed with a body mounting flange 29a on its outer circumference. The inner circumference includes double row outer raceway surfaces 4a, 21a. Two inner rings 22, 23 are formed with inner raceway surfaces 22a, 23a on their outer circumference. The inner raceway surfaces 22a, 23a are arranged opposite to the double row outer raceway surfaces 4a, 21a. A plurality of balls 9 and tapered rollers 10 are freely rollably contained between the outer and inner raceway surfaces 4a, 22a; 21a, 23a, via cages 7, 24.

The outer member 38 is made of medium carbon steel including carbon of 0.40~0.80% by weight such as S53C. The double row outer raceway surfaces 4a, 21a are hardened by high frequency induction quenching to have a surface hardness of 58~64 HRC. Seals 11, 25a are mounted within annular openings formed between the outer member 38 and two inner rings 22, 23. The seals 11, 25a prevent leakage of grease contained in the bearing and rain water and dusts from entering into the bearing from the outside. The inner side seal 25a is made of conductive material with mingled conductive powder.

In this embodiment, a pitch circle diameter PCDi of the inner side row of tapered rollers 10 is set smaller than a pitch circle diameter PCDo of the outer side row of balls 9. This enables the inner side outer diameter D of the outer member 38 to be small. Accordingly, this reduces the knuckle size without reducing the fundamental rated load of the inner side row of rolling elements and thus reduces the weight and size of the wheel bearing apparatus. In addition, it is possible to make the cylindrical portion 19b as a straight cylinder. This improves the workability of the wheel hub 19 even though a difference in the pitch circle diameters PCDo and PCDi is provided by making the thickness of the outer side inner ring 22 larger corresponding to the enlargement of the pitch circle diameter PCDo of the outer side row of balls 9.

FIG. 16 is a longitudinal section view of a ninth embodiment of the vehicle wheel bearing apparatus. This embodiment is only fundamentally different from the fourth embodiment (FIG. 9) in structures of the outer member and seal. Thus, the same reference numerals as those used in the fourth embodiment are also used in this embodiment.

The wheel bearing apparatus of this embodiment is a third generation type for a driven wheel. It includes an outer member 38 and the inner member 27 including the wheel hub 26. The inner ring 23 is press-fit onto a cylindrical portion 26a of the wheel hub 26. Seals 18, 25a are mounted within annular openings formed between the outer member 38 and the wheel hub 26 and inner ring 23. The seals 18, 25a prevent leakage of grease contained in the bearing and rain water and dusts from entering into the bearing from the outside.

Also in this embodiment, similarly to the fourth embodiment, a pitch circle diameter PCDi of the inner side row of tapered rollers 10 is set smaller than a pitch circle diameter PCDo of the outer side row of balls 9. Thus, the number of the outer side row of balls 9 is set larger than the number of the inner side row of tapered rollers 10. This increases the bearing rigidity and makes the inner side outer diameter D of the outer member 38 small. Accordingly, this reduces the knuckle size without reducing the fundamental rated load of the inner side row of rolling elements and thus reduces the weight and size of the wheel bearing apparatus. Accordingly, it is possible for the fundamental rated load of the inner side bearing row to be larger than that of the outer side bearing row. This keeps the life of the bearing apparatus even though a load applied to the inner side row of rolling elements exceeds a load applied to the outer side row of rolling elements.

FIG. 17 is a longitudinal section view of a tenth embodiment of the vehicle wheel bearing apparatus. This embodiment is only fundamentally different from the first embodiment (FIG. 1) materials of the outer member and inner member. Thus, the same reference numerals as those used in the first embodiment are also used in this embodiment.

The bearing apparatus of this embodiment is a second generation type for a driven wheel. It includes a wheel hub 39 and a wheel bearing 40 secured on the wheel hub 39. The wheel hub 39 is integrally formed with a wheel mounting flange on its outer side end. The wheel mounting flange 3 includes hub bolts 3a that are equidistantly mounted along its periphery. A cylindrical portion 1b axially extends from a base 1a of the wheel mounting flange 3.

The wheel bearing 40 is press-fit onto the cylindrical portion 1b. It abuts against the shoulder 1a of the wheel hub 39. The bearing 40 is axially secured by a caulked portion 1c that is formed by plastically deforming the end of the cylindrical portion 1b.

The wheel bearing 40 includes an outer member 41 integrally formed with a body mounting flange 4c on its outer circumference. Its inner circumference includes double row outer raceway surfaces 4a, 4b. Two inner rings 42, 43 are each formed with inner raceway surfaces 5a, 6a on its outer circumference. The inner raceway surfaces 5a, 6a, respectively, are positioned opposite to the double row outer raceway surfaces 4a, 4b. A plurality of balls 9 and tapered rollers 10 are freely rollably contained between the outer and inner raceway surfaces 4a, 4b and 5a, 6a, via cages 7, 8. Seals 11, 12 are mounted within annular openings formed between the outer member 41 and inner rings 42, 43. The seals 11, 12 prevent leakage of grease contained in the bearing and rain water and dusts from entering into the bearing from the outside.

In this embodiment, the pitch circle diameter PCD of the outer side row of balls 9 and a pitch circle diameter PCD of the inner side row of tapered rollers 10 are set the same as each other. Accordingly, the rigidity of the inner side row of rolling elements can be increased. Thus, the fundamental rated load of the inner side row of rolling elements can be larger than that of the outer side row of rolling elements. Accordingly, it is possible to keep the life of the bearing apparatus even though a load applied to the inner side row of rolling elements exceeds a load applied to the outer side row of rolling elements. Thus, it is possible to realize a useful design of the wheel bearing apparatus and provide a wheel bearing apparatus with improved strength and durability.

The wheel hub 39 is made of carbon steel including carbon of 0.60~0.80% by weight. A region including a shoulder portion 1a and cylindrical portion 1b is hardened by high frequency induction quenching to form a hardened layer 44 (shown by cross-hatching) with a surface hardness of 58~64 HRC. The caulking portion 1c is kept with its original surface hardness after its forging. Since the amount of carbon included is less than that of high carbon chrome bearing steel such as SUJ2 (0.95~1.10% by weight), workability and cutting of the wheel hub 39 is improved. Also, it has sufficient mechanical strength relative to the rotary bending load applied to the wheel mounting flange 3. Accordingly, anti-fretting characteristics of the cylindrical portion 1b forming the fitting portion of the wheel bearing 40 can be improved. Thus, the plastic deformation of the caulking portion 1c can be smoothly performed while preventing the generation of micro-cracks.

Similarly to the wheel hub 39, the outer member 41 is made of carbon steel including carbon of 0.60~0.80% by weight. The double row outer raceway surfaces 4a, 4b are hardened by high frequency induction quenching to form a hardened layer 45 (shown by cross-hatching) with a surface hardness of 58~64 HRC. The inner rings 42, 43 are also made of carbon steel including C of 0.60-0.80% by weight. They are hardened at their outer circumferential surfaces by high frequency induction quenching to form a hardened layer 46, 46 (shown by cross-hatching) with a surface hardness of 58~64 HRC. This improves workability and cutting properties as well as wear resistance and rolling fatigue life of the bearing apparatus. The outer member, forming a stationary member, may be formed of medium carbon steel such as conventionally used S53C.

The wheel hub 39 and inner rings 42, 43, which form rotational members, are preferably made of steel including C of 0.70-0.80% by weight, Si of 0.50~1.0% by weight, Mn of 0.10~2.0% by weight, Cr of 0.40~0.95% by weight, Al of less than 0.050% by weight, 0 of less than 0.0030% by weight, and the residue of Fe and inevitable impurities. It is possible to further improve the workability and rolling fatigue life of the bearing apparatus by using such a steel member.

The strength, wear resistance and rolling fatigue life can be improved by increasing the amount of the content of carbon forming the steel member. However, the workability and cutting properties of the steel member are extremely detracted when the percentage content exceeds 0.80% by weight. Thus, the upper limit of the percentage content of C is set at 0.80% by weight. Si is an inevitable element for deoxidation and improvement of rolling fatigue life. However its effect cannot be expected at percentage content less than 0.50% by weight. On the other hand, the workability and cutting properties of the steel member are extremely detracted at percentage content exceeding 1.0% by weight. Thus the upper limit of the percentage content of Si is set at 1.0% by weight. Mn is an effective element for improving the hardenability of steel and for increasing toughness of the steel to improve the rolling fatigue life. However, its effect cannot be expected at percentage content of Mn less than 0.10% by weight. On the other hand, the workability and cutting properties of the steel member are extremely detracted at percentage content exceeding 2.0% by weight. Thus, the percentage content of Mn is set at a range of 0.10~2.0% weight by weight, preferably 0.50~1.20% by weight.

Cr is effective for improving the hardenability, strength and toughness of the steel. However, its effect cannot be expected at percentage content less than 0.40% by weight. On the other hand, it is not preferable that diffusion annealing is indispensable while being influenced by other elements at percentage content exceeding 0.95% by weight. The effects brought on by Cr are saturated at percentage content of 0.80% by weight. Giant carbide particles tend to be easily formed during melting at percentage content exceeding 0.80% by weight while influencing by other elements, especially amounts of C and Si. Thus, the percentage content of Cr is set at a range of 0.40-0.95% by weight, preferably 0.40-0.80% by weight.

Al is added as deoxidizer. However, since it bonds with 0 to form hard interleaving oxide, it detracts from the rolling fatigue life. Thus, it is desirable that the percentage content of Al is as small as possible. Its upper limit is set at 0.050% by weight. Similarly, it is desirable that the percentage content of 0 is as small as possible. Its upper limit is set at 0.0030% by weight.

FIG. 18 is a longitudinal section view of an eleventh embodiment of the vehicle wheel bearing apparatus. This embodiment is only fundamentally different from the tenth embodiment (FIG. 17) in the structure of the wheel hub. Thus, the same reference numerals as those used in the tenth embodiment are also used in this embodiment.

The wheel bearing apparatus of this embodiment is a third generation type for a driven wheel. It includes an outer member 41 and an inner member 48 with a wheel hub 47. An inner ring 43 is press-fit onto a cylindrical portion 16b of the wheel hub 47. The wheel hub 47 is directly formed with an outer side inner raceway surface 16a on its outer circumference. The wheel hub 47 has the cylindrical portion 16b that axially extends from the inner raceway surface 16a. The inner ring 43 is press-fit onto the cylindrical portion 16b, via a predetermined interference, and axially secured by the caulked portion 1c.

Seals 18, 12 are mounted within annular openings formed between the outer member 41 and the wheel hub 47 and inner ring 43. The seals 18, 12 prevent leakage of grease contained in the bearing and rain water and dusts from entering into the bearing from the outside.

The wheel hub 47 is made of carbon steel including carbon of 0.60~0.80% by weight, preferably 0.70~0.80% by weight. It is hardened by high frequency induction quenching to form a hardened layer 44 with a surface hardness of 58~64 HRC. The hardened layer 44 includes a seal land portion, on which the seal 18 sliding contacts, inner raceway surface 16a and the cylindrical portion 16b.

Similarly to the previous embodiments, and also in this embodiment, a pitch circle diameter PCD of the outer side row of balls 9 and a pitch circle diameter PCD of the inner side row of tapered rollers 10 are set the same as each other. Accordingly, it is possible to increase the rigidity of the inner side row of rolling elements and keep the life of the bearing apparatus even though a load applied to the inner side row of rolling elements exceeds a load applied to the outer side row of rolling elements.

FIG. 19 is a longitudinal section view of a twelfth embodiment of the vehicle wheel bearing apparatus. This embodiment is only fundamentally different from the tenth embodiment (FIG. 17) in the pitch circle diameters of both rows of rolling elements. Thus, the same reference numerals as those used in the tenth embodiment are also used in this embodiment.

The wheel bearing apparatus of this embodiment is a second generation type for a driven wheel. It includes the wheel hub 19 and a wheel bearing 49 secured on the wheel hub 19.

The wheel bearing 49 includes an outer member 50 with a body mounting flange 4c formed on its outer circumference. Its inner circumference includes the double row outer raceway surfaces 4a, 21a. Two inner rings 51, 52 are each formed with inner raceway surfaces 22a, 23a on their outer circumference. The inner raceway surfaces 22a, 23a are arranged opposite to the double row outer raceway surfaces 4a, 21a. A plurality of balls 9 and tapered rollers 10 are freely rollably contained between the outer and inner raceway surfaces 4a, 22a; 21a, 23a, via cages 7, 24. Seals 11, 25 are mounted within annular openings formed between the outer member 50 and the two inner rings 51, 52. The seals 11, 25 prevent leakage of grease contained in the bearing and rain water and dusts from entering into the bearing from outside.

The outer member 50 is made of carbon steel including C of 0.60~0.80% by weight. The double row outer raceway surfaces 4a, 21a are formed with a hardened layer 45 hardened by high frequency induction quenching to have a surface hardness of 58~64 HRC. In addition, the inner rings 51, 52 are made of carbon steel including C of 0.60-0.80% by weight. Their inner raceway surfaces 22a, 23a and outer circumferential surface are formed with hardened layers 44, 46 with a hardness of 58~64 HRC.

In this embodiment, a pitch circle diameter PCDi of the inner side row of tapered rollers 10 is set smaller than a pitch circle diameter PCDo of the outer side row of balls 9. This enables the inner side outer diameter D of the outer member 50 to be small. Accordingly, this reduces the knuckle size without reducing the fundamental rated load of the inner side row of rolling elements and thus reduces the weight and size of the wheel bearing apparatus. In addition, it is possible to make the cylindrical portion 19b as a straight cylinder. Thus, this improves the workability of the wheel hub 19 even though the difference in the pitch circle diameters PCDo and PCDi is provided by making the thickness of the outer side inner ring 51 larger corresponding to the enlargement of the pitch circle diameter PCDo of the outer side row of balls 9.

FIG. 20 is a longitudinal section view of a thirteenth embodiment of the vehicle wheel bearing apparatus. This embodiment is only fundamentally different from the twelfth embodiment (FIG. 19) in the structure of the wheel hub. Thus, the same reference numerals as those used in the twelfth embodiment are also used in this embodiment.

The wheel bearing apparatus of this embodiment is a third generation type for a driven wheel. It includes an outer member 50 and an inner member 54 with a wheel hub 53. An inner ring 23 is press-fit onto a cylindrical portion 26a of a wheel hub 53. The wheel hub 53 is formed with an inner raceway surface 16a on its outer circumference. The outer side inner raceway surface 16a is arranged opposite to the outer side outer raceway surface 4a. The cylindrical portion 26a axially extends from the inner raceway surface 16a. The inner ring 23 is press-fit onto the cylindrical portion 26a, via a predetermined interference, and is axially secured by the caulked portion 1c.

Seals 18, 25 are mounted within annular openings formed between the outer member 50 and the wheel hub 53 and inner ring 23. The seals 18, 25 prevent leakage of grease contained in the bearing and rain water and dusts from entering into the bearing from the outside.

The wheel hub 53 is made of carbon steel including C of 0.60~0.80% by weight. It is hardened by high frequency induction quenching to form a hardened layer 44 with a surface hardness of 58~64 HRC. The hardened layer includes a seal land portion, on which the seal 18 sliding contacts, inner raceway surface 16a and the cylindrical portion 26a.

Also in this embodiment, similarly to the previous embodiment, a pitch circle diameter PCDi of the inner side row of tapered rollers 10 is set smaller than a pitch circle diameter PCDo of the outer side row of balls 9. Thus, the number of the outer side row of balls 9 is set larger than the number of the inner side row of tapered rollers 10. This increases the bearing rigidity and makes the inner side outer diameter D of the outer member 50 small. Accordingly, this reduces the knuckle size without reducing the fundamental rated load of the inner side row of rolling elements and thus reduces the weight and size of the wheel bearing apparatus. Accordingly, it is possible to make the fundamental rated load of the inner side bearing row larger than that of the outer side bearing row. This keeps the life of the bearing apparatus even though a load applied to the inner side row of rolling elements exceeds a load applied to the outer side row of rolling elements.

The wheel bearing apparatus of the present disclosure can be applied to any second or third generation bearing apparatus irrespective of the driving wheel or the driven wheel.

The present disclosure has been described with reference to the preferred embodiments. Obviously, modifications and alternations will occur to those of ordinary skill in the art upon reading and understanding the preceding detailed description. It is intended that the present disclosure be construed as including all such alternations and modifications insofar as they come within the scope of the appended claims or their equivalents.

What is claimed is:

1. A vehicle wheel bearing apparatus comprising:
   an outer member formed with a body mounting flange on its outer circumference, said body mounting flange to be mounted on a knuckle of a vehicle, an inner circumference of said outer member including double row outer raceway surfaces;
   an inner member includes a wheel hub with a wheel mounting flange formed on one end, a cylindrical portion extends from said wheel mounting flange, at least one inner ring is press-fit onto the cylindrical portion of the wheel hub, said at least one inner ring formed with an inner raceway surface on its outer circumference, said inner raceway surface arranged opposite to the double row outer raceway surfaces;
   double row rolling elements are freely rollably contained between the outer raceway surfaces and inner raceway surfaces of the outer member and the inner members;
   seals are mounted within annular openings formed between the outer member and the inner member;
   said at least one inner ring is axially secured relative to the wheel hub by a caulked portion, said caulked portion formed by radially outwardly plastically deforming an end of the cylindrical portion of the wheel hub;
   outer side rolling elements of the double row rolling elements are balls and inner side rolling elements of the double row rolling elements are tapered rollers and a number of the inner side row of tapered rollers is set larger than a number of the outer side row of balls wherein an inner side outer diameter of the outer member is smaller than an outer side outer diameter of the outer member so that the inner side outer diameter is larger than a diameter of the outer side outer raceway surface;
   a fundamental rated load of the inner side row of tapered rollers is set larger than that of the outer side row of balls;
   a pitch circle diameter of the inner side row of tapered rollers is set smaller than a pitch circle diameter of the outer side row of balls; and a number of the inner side row of tapered rollers is set larger than a number of the outer side row of balls.

2. The vehicle wheel bearing apparatus of claim 1, further comprising an electric insulating coating layer formed on contacting surfaces between the outer member and the knuckle.

3. The vehicle wheel bearing apparatus of claim 1, further comprising at least one of the seals has a conductive sealing member.

4. The vehicle wheel bearing apparatus of claim 1, wherein at least a rotational member of the outer member and the inner member is made of carbon steel including C of 0.60~0.80% by weight and formed at a predetermined portion with a hardened layer by high frequency induction quenching.

5. The vehicle wheel bearing apparatus of claim 4, wherein the rotational member is made of steel member including C of 0.70~0.80% by weight, Si of 0.50~1.0% by weight, Mn of 0.10~2.0% by weight, Cr of 0.40~0.95% by weight, Al of less than 0.050% by weight, O of less than 0.0030% by weight, and the residue of Fe and inevitable impurities.

6. The vehicle wheel bearing apparatus of claim 1, further comprising an inner side cage for the tapered rollers is made of engineered plastic superior for mechanical strength, oil resistance and heat resistance and has a cage pocket angle of 55~90° and a rolling coefficient $\gamma$ larger than 0.94.

7. The vehicle wheel bearing apparatus of claim 1, wherein the outer side inner raceway surface is directly formed on the outer circumference of the wheel hub and the cylindrical portion extends from the outer side inner raceway surface toward the inner side, the inner side inner ring is press-fit onto the cylindrical portion via a predetermined interference.

* * * * *